(12) United States Patent
Irisawa

(10) Patent No.: US 8,364,382 B2
(45) Date of Patent: *Jan. 29, 2013

(54) ENGINE CONTROL SYSTEM

(75) Inventor: Yasuyuki Irisawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 443 days.

This patent is subject to a terminal disclaimer.

(21) Appl. No.: 12/673,293

(22) PCT Filed: Apr. 2, 2009

(86) PCT No.: PCT/JP2009/057238
§ 371 (c)(1),
(2), (4) Date: Feb. 12, 2010

(87) PCT Pub. No.: WO2010/113332
PCT Pub. Date: Oct. 7, 2010

(65) Prior Publication Data
US 2012/0136551 A1    May 31, 2012

(51) Int. Cl.
*B60T 7/12* (2006.01)
(52) U.S. Cl. ............ 701/103; 123/319; 123/406.23
(58) Field of Classification Search .......... 701/103–105, 701/114; 123/319, 321, 322, 406.23
See application file for complete search history.

(56) References Cited

U.S. PATENT DOCUMENTS

| | | | |
|---|---|---|---|
| 7,669,559 B2 * | 3/2010 | Aoyama et al. | 123/48 B |
| 2010/0206271 A1 * | 8/2010 | Akihisa et al. | 123/48 C |
| 2011/0005497 A1 * | 1/2011 | Irisawa | 123/48 R |
| 2012/0059543 A1 * | 3/2012 | Nakazono et al. | 701/22 |

FOREIGN PATENT DOCUMENTS

| | | |
|---|---|---|
| JP | A 63-120820 | 5/1988 |
| JP | A 2004-044433 | 2/2004 |
| JP | A 2005-030289 | 2/2005 |
| JP | A 2005-106020 | 4/2005 |
| JP | A 2005-180231 | 7/2005 |
| JP | A 2007-071046 | 3/2007 |
| JP | A 2007-332870 | 12/2007 |
| JP | A 2009-019589 | 1/2009 |

OTHER PUBLICATIONS

International Search Report issued in corresponding International Application No. PCT/JP2009/057238, mailed Jun. 9, 2009. (with English-language translation).

* cited by examiner

*Primary Examiner* — John Kwon
(74) *Attorney, Agent, or Firm* — Oliff & Berridge, PLC

(57) ABSTRACT

In a hybrid type vehicle designed to use an engine (1) and motor generators (MG1, MG2) to drive the vehicle, the engine (1) is provided with a variable compression ratio mechanism (A) and a variable valve timing mechanism (B). When a required output of the engine (1) is a boundary output (PY) or less, minimum fuel consumption rate maintenance control satisfying the required output of the engine by changing the engine speed in a state maintaining the mechanical compression ratio at the maximum compression ratio is performed. When the required output of the engine is increased over the boundary output (PY), the mechanical compression ratio is lowered to the minimum mechanical compression ratio, then the engine output is increased.

9 Claims, 26 Drawing Sheets

Fig. 2
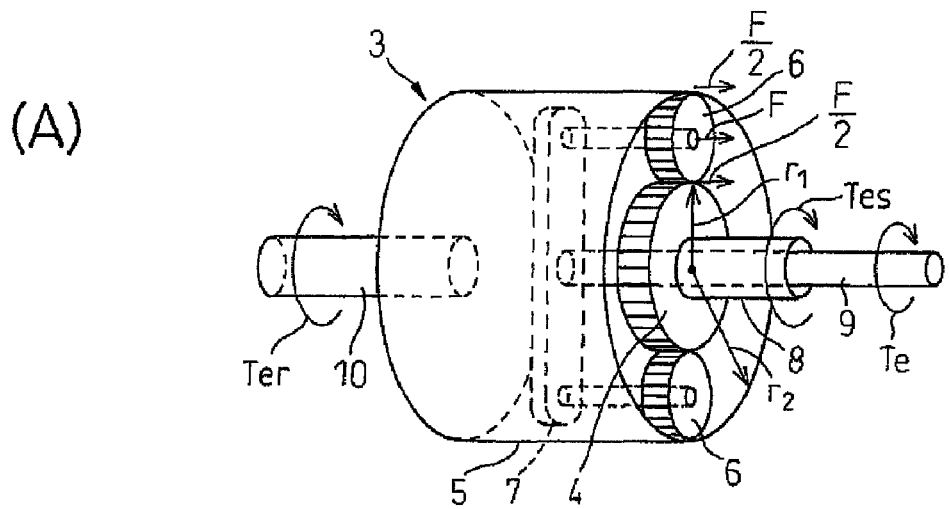
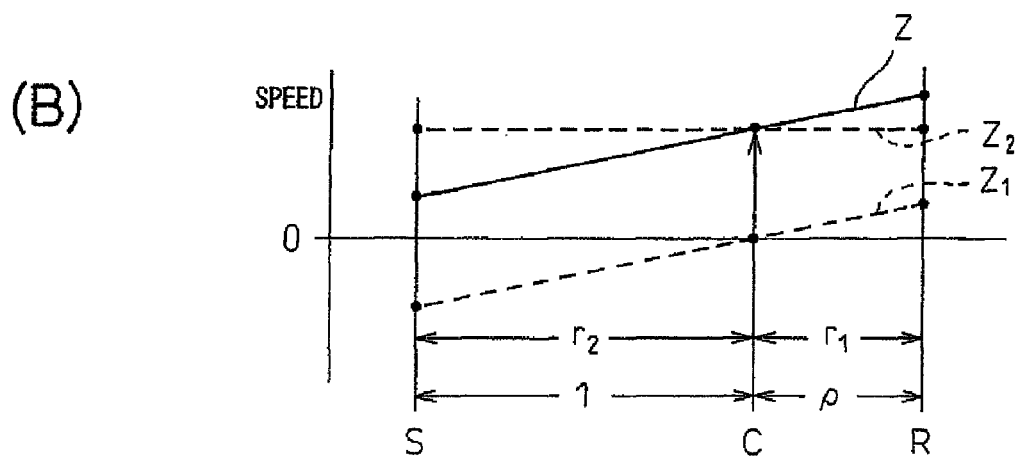
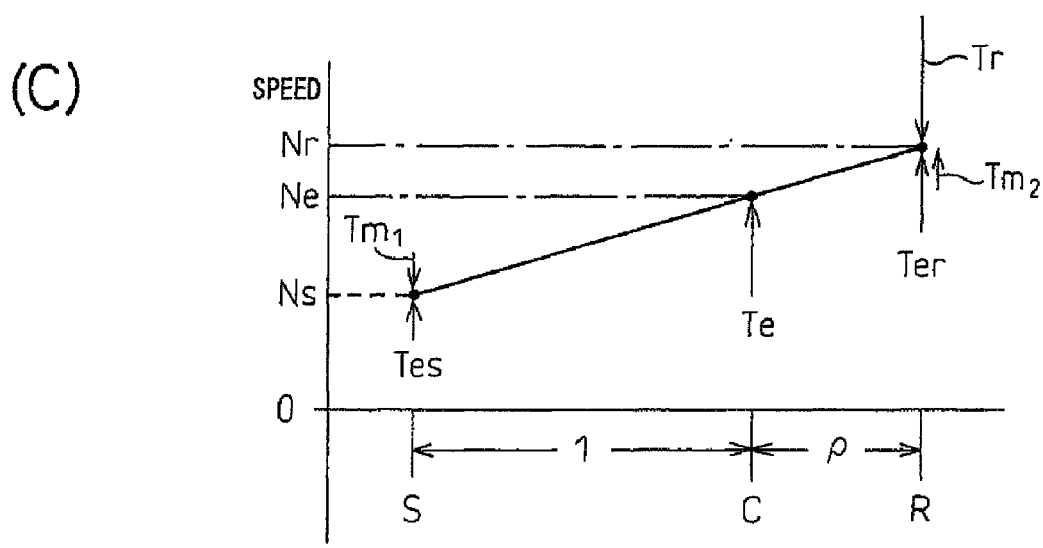

Fig. 3
(A)
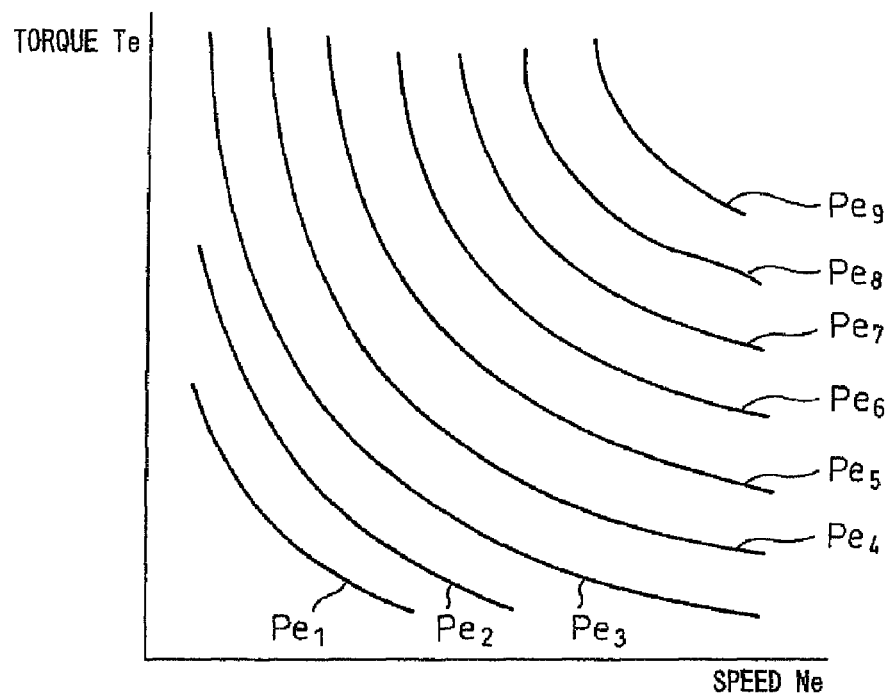
(B)
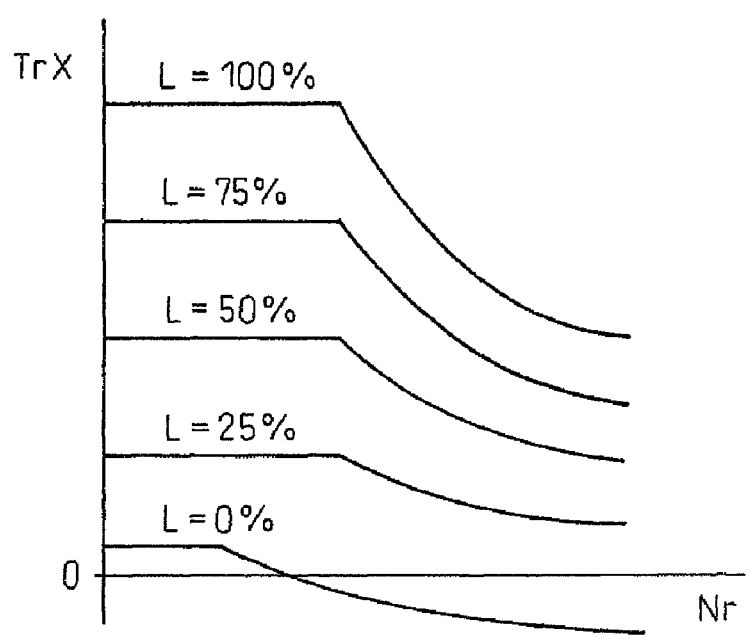

Fig. 5
(A)
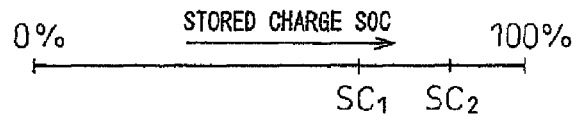
(B)
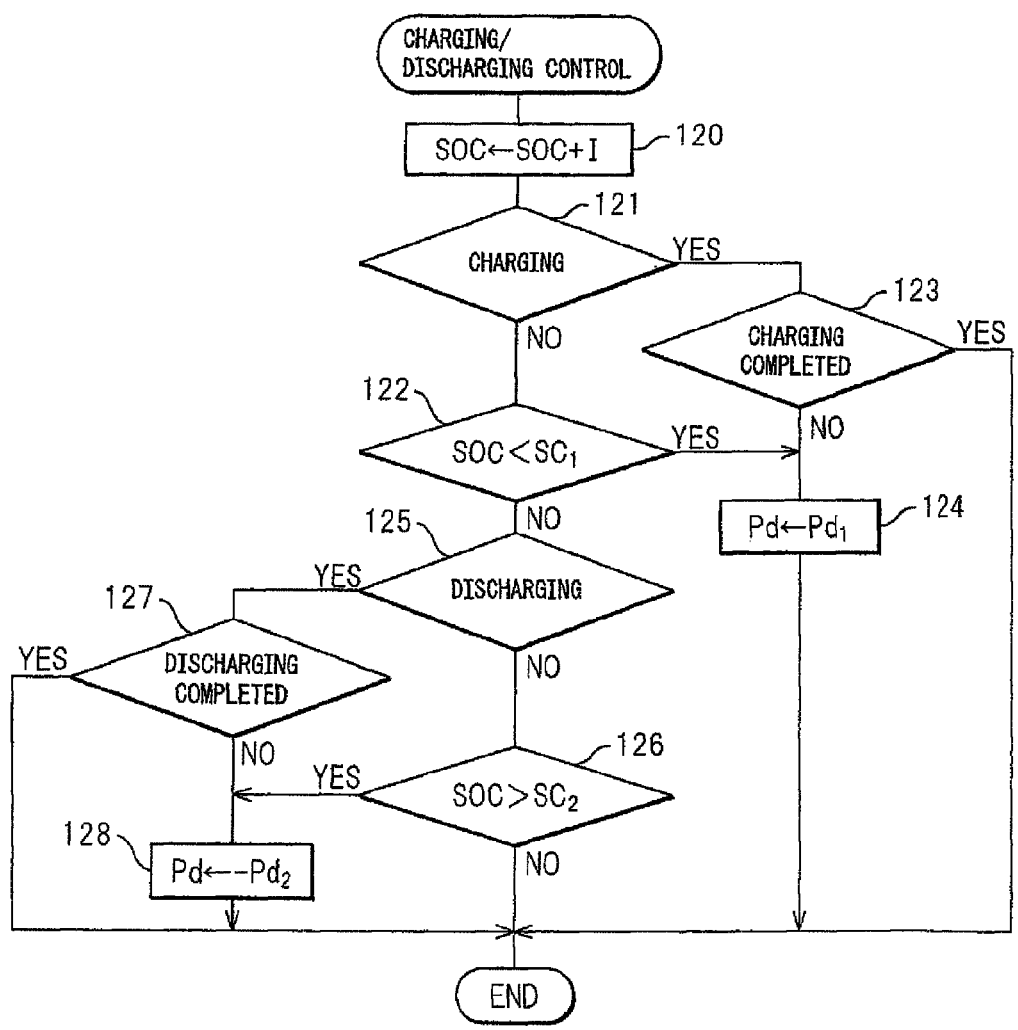

(A)  (B)

Fig.11
(A)
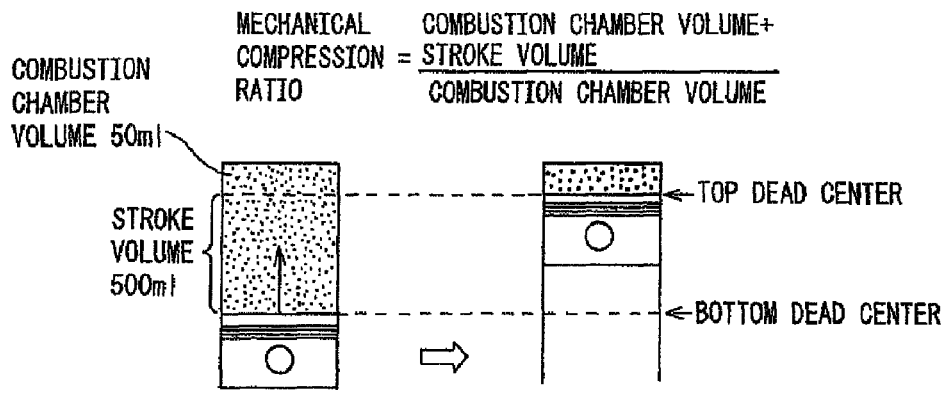
(B)
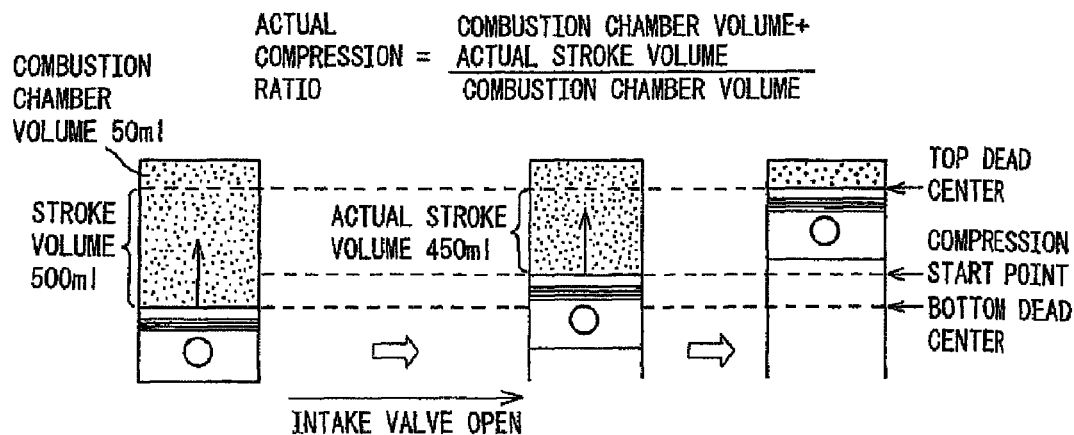
(C)
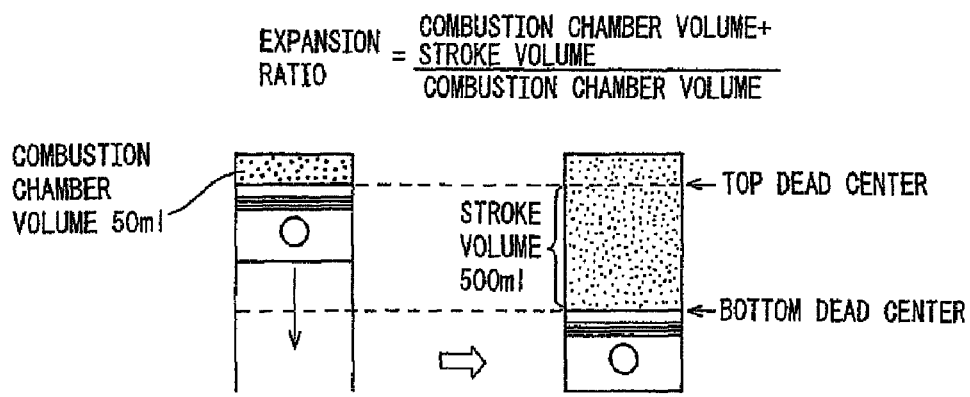

Fig.16
(A)
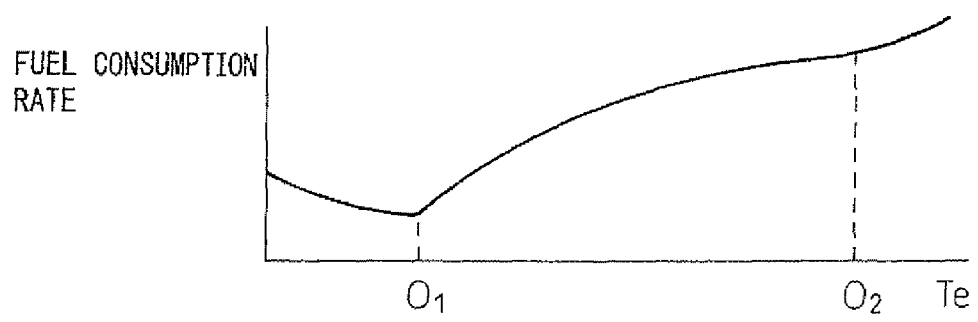
(B)
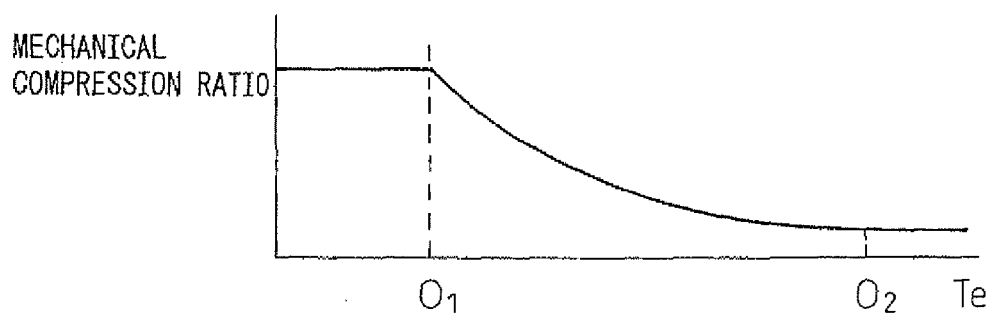

ENGINE CONTROL SYSTEM

TECHNICAL FIELD

The present invention relates to an engine control system.

BACKGROUND ART

Known in the art is a hybrid type vehicle designed to use one or both of an engine and an electric motor to drive the vehicle, wherein the engine is comprised of an engine provided with a variable compression ratio mechanism, a compression ratio is found whereby an overall efficiency considering an efficiency of the engine, an efficiency of the electric motor, an efficiency of a power transmission system, and all other efficiencies becomes the highest, and a compression ratio of the engine is controlled to the compression ratio giving this highest overall efficiency.

CITATION LIST

Patent Literature
Patent Literature 1 Japanese Patent publication No 2004-44433A

SUMMARY OF INVENTION

Technical Problem

However, even if only controlling the compression ratio so that the overall efficiency becomes the highest, there is a limit to the improvement of the fuel consumption rate. Development of a vehicle giving a more superior fuel consumption rate is currently desired.

An object of the present invention is to provide an engine control system able to obtain a more superior fuel consumption rate while securing a required output of an engine when the required output of the engine increases by controlling a mechanical compression ratio and a closing timing of an intake valve, and able to suppress an occurrence of vibration and noise.

Solution to Problem

According to the present invention, there is provided an engine control system provided with an output regulating system enabling setting of a desired combination of an engine torque and an engine speed giving a same engine output, wherein a variable compression ratio mechanism able to change a mechanical compression ratio and a variable valve timing mechanism able to control a closing timing of an intake valve are provided and when a required output of the engine is lower than a predetermined boundary output, a minimum fuel consumption rate maintenance control satisfying a required output of the engine by changing the engine speed in a state maintaining the mechanical compression ratio at a predetermined compression ratio or more is performed and when the required output of the engine increases over the boundary output, an output increase control increasing the engine torque after lowering the mechanical compression ratio to the predetermined compression ratio or less is performed.

BRIEF DESCRIPTION OF DRAWINGS

FIG. 2 is a view for explaining an action of the output regulating system,

FIG. 3 is a view showing a relationship between an output of the engine and an engine torque Te and engine speed Ne etc., FIG. 5 is a view explaining a charging and discharging control of a battery, FIG. 11 is a view for explaining a mechanical compression ratio and an actual compression ratio and expansion ratio, FIG. 16 is a view showing changes in the fuel consumption rate and mechanical compression ratio.

MODE FOR CARRYING OUT THE INVENTION

Figure 1:
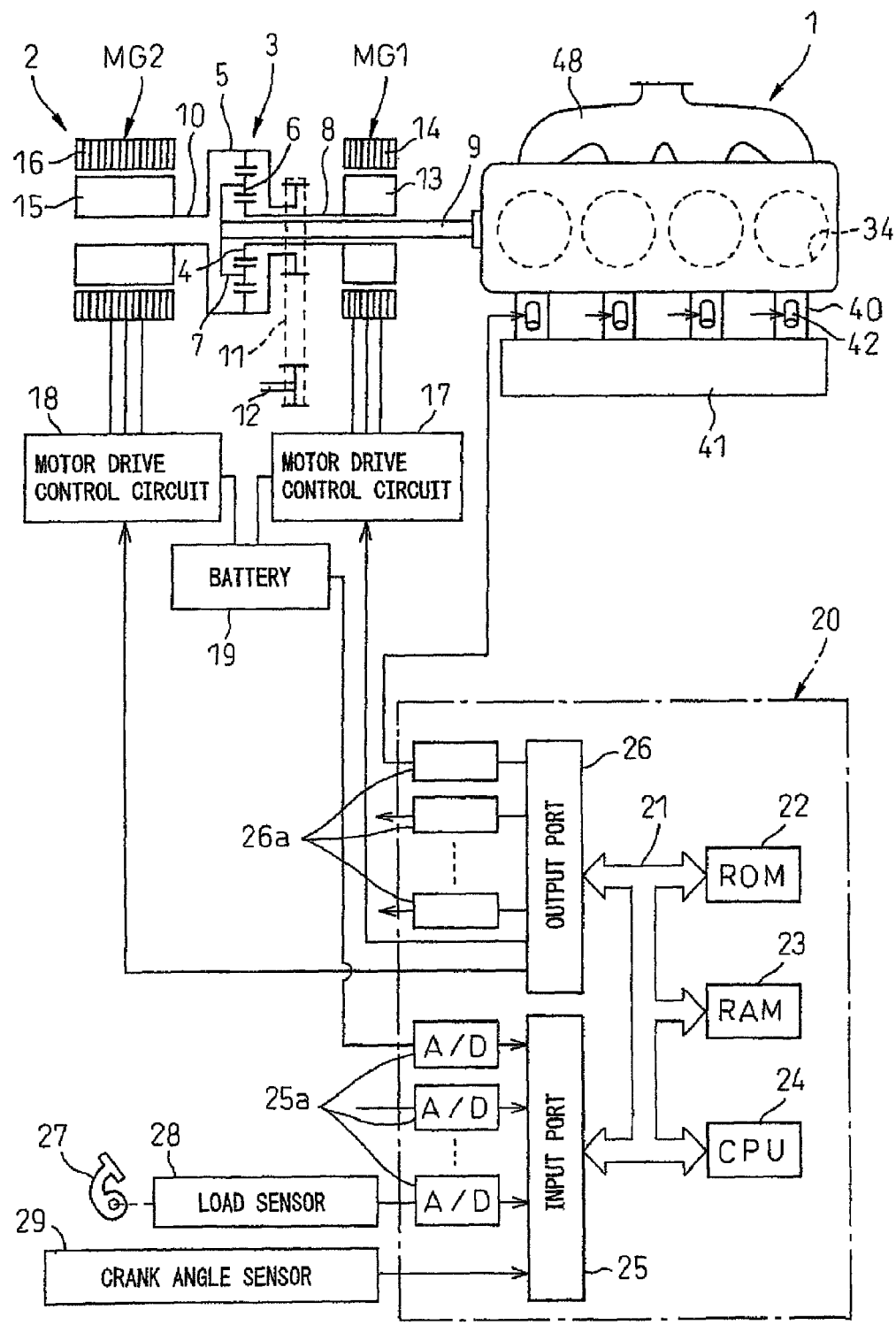
FIG. 1 is an overview of an engine and an output regulating system.

FIG. 1 is an overview of a spark ignition type engine 1 and an output regulating system 2 mounted in a hybrid type vehicle.

First, referring to FIG. 1, the output regulating system 2 will be simply explained. In the embodiment shown in FIG. 1, the output regulating system 2 is comprised of a pair of motor generators MG1 and MG2 operating as electric motors and generators and a planetary gear mechanism 3. This planetary gear mechanism 3 is provided with a sun gear 4, a ring gear 5, planet gears 6 arranged between the sun gear 4 and the ring gear 5, and a planetary gear carrier 7 carrying the planet gears 6. The sun gear 4 is coupled to a shaft 8 of the motor generator MG1, while the planetary gear carrier 7 is coupled to an output shaft 9 of the engine 1. Further, the ring gear 5 on the one hand is coupled to a shaft 10 of the motor generator MG2 and on the other hand is coupled to an output shaft 12 coupled to the drive wheels through a belt 11. Therefore, it is learned that if the ring gear 5 rotates, the output shaft 12 is made to rotate along with this.

The motor generators MG1 and MG2 are respectively comprised of AC synchronized motors provided with rotors 13 and 15 attached to corresponding shafts 8 and 10 and having pluralities of permanent magnets attached to the outer circumferences and stators 14 and 16 provided with excitation coils forming rotating magnetic fields. The excitation coils of the stators 14 and 16 of the motor generators MG1 and MG2 are connected to corresponding motor drive control circuits 17 and 18, while these motor drive control circuits 17 and 18 are connected to a battery 19 generating a DC high voltage. In the embodiment shown in FIG. 1, the motor generator GM2 mainly operates as an electric motor while the motor generator GM1 mainly operates as a generator.

An electronic control unit 20 is comprised of a digital computer and is provided with a ROM (read only memory) 22, RAM (random access memory) 23, CPU (microprocessor) 24, input port 25, and output port 26 which are interconnected to each other by a bidirectional bus 21. An accelerator pedal 27 is connected to a load sensor 28 generating an output voltage proportional to an amount of depression L of the accelerator pedal 27. An output voltage of the load sensor 28 is input through a corresponding AD converter 25a to an input port 25. Further, the input port 25 is connected to a crank angle sensor 29 generating an output pulse every time a crankshaft rotates by for example 15°. Furthermore, the input port 25 receives as input a signal expressing the charging and discharging current of the battery 19 and other various signals through the corresponding AD converter 25a. On the other hand, the output port 26 is connected to the motor drive control circuits 17 and 18 and is connected through a corresponding drive circuit 26a to components for controlling the engine 1, for example, a fuel injector etc.

When driving the motor generator MG2, the DC high voltage of the battery 19 is converted at the motor drive control circuit 18 to three-phase AC with a frequency of fm and a current value of Im. This three-phase AC is supplied to the excitation coil of the stator 16. This frequency fm is the frequency required for making the rotating magnetic field generated by the excitation coil rotate synchronously with rotation of the rotor 15. This frequency fm is calculated by the CPU 24 based on the speed of the output shaft 10. In the motor drive control circuit 18, this frequency fm is made the frequency of the three-phase AC. On the other hand, the output torque of the motor generator MG2 becomes substantially proportional to the current value Im of the three-phase AC. This current value Im is calculated based on the required output torque of the motor generator MG2. At the motor drive control circuit 18, this current value Im is made the current value of the three-phase AC.

Further, if setting a state using external force to drive the motor generator MG2, the motor generator MG2 acts as generator. The power generated at this time is recovered in the battery 19. The required drive torque when using external force to drive the motor generator MG2 is calculated at the CPU 24. The motor drive control circuit 18 is operated so that this required drive torque acts on the shaft 10.

This sort of drive control on the motor generator MG2 is similarly performed on the motor generator MG1. That is, when driving the motor generator MG1, the DC high voltage of the battery 19 is converted at the motor drive control circuit 17 to a three-phase AC with a frequency of fm and a current value of Im. This three-phase AC is supplied to the excitation coil of the stator 14. Further, if setting a state using external force to drive the motor generator MG1, the motor generator MG1 operates as a generator. The power generated at this time is recovered in the battery 19. At this time, the motor drive control circuit 17 is operated so that the calculated required drive torque acts on the shaft 8.

Next, referring to FIG. 2(A) illustrating the planetary gear mechanism 3, the relationship of the torques acting on the different shafts 8, 9, and 10 and the relationship of the speeds of the shafts 8, 9, and 10 will be explained.

In FIG. 2(A), $r_1$ shows the radius of a pitch circle of the sun gear 4, while $r_2$ shows the radius of a pitch circle of the ring gear 5. Now, assume that in the state shown in FIG. 2(A), a torque Te is applied to the output shaft 9 of the engine 1 and a force F acting in the direction of rotation of the output shaft 9 is generated at the center of rotation of each planet gear 6. At this time, at the parts meshing with the planet gear 6, the sun gear 4 and ring gear 5 are acted upon by a force F/2 in the same direction as the force F. As a result, the shaft 8 of the sun gear 4 is acted upon by a torque Tes ($=(F/2) \cdot r_1$), while the shaft 10 of the ring gear 5 is acted upon by a torque Ter ($=(F/2) \cdot r_2$). On the other hand, a torque Te acting on the output shaft 9 of the engine 1 is expressed by $F \cdot (r_1+r_2)/2$, so if expressing the torque Tes acting on the shaft 8 of the sun gear 4 by $r_1$, $r_2$, and Te, the result becomes Tes$=(r_1/(r_1+r_2)) \cdot$Te, while if expressing the torque Ter acting on the shaft 10 of the ring gear 5 by $r_1$, $r_2$, and Te, the result becomes Ter$=(r_2/(r_1+r_2)) \cdot$Te.

That is, the torque Te occurring at the output shaft 9 of the engine 1 is split into the torque Tes acting on the shaft 8 of the sun gear 4 and the torque Ter acting on the shaft 10 of the ring gear 5 by the ratio of $r_1:r_2$. In this case, $r_2 > r_1$, so the torque Ter acting on the shaft 10 of the ring gear 5 always becomes larger than the torque Tes acting on the shaft 8 of the sun gear 4. Note that, if defining the radius $r_1$ of the pitch circle of the sun gear/radius $r_2$ of the pitch circle of the ring gear 5, that is, the number of teeth of the sun gear 4/number of teeth of the ring gear 5, as ρ, Tes is expressed as Tes$=(\rho/(1+\rho)) \cdot$Te and Ter is expressed as Ter$=(1/(1+\rho)) \cdot$Te.

On the other hand, if the rotational direction of the output shaft 9 of the engine 1, that is, the direction of action of the torque Te shown by the arrow mark in FIG. 2(A), is made the forward direction, when the rotation of the planetary gear carrier 7 is stopped and in that state the sun gear 4 is made to rotate in the forward direction, the ring gear 5 rotates in the opposite direction. At this time, the ratio of the speeds of the sun gear 4 and the ring gear 5 becomes $r_2:r_1$. The broken line $Z_1$ of the FIG. 2(B) illustrates the relationship of the speeds at this time. Note that, in FIG. 2(B), the ordinate shows the forward direction above zero 0 and the reverse direction below it. Further, in FIG. 2(B), S shows the sun gear 4, C shows the planetary gear carrier 7, and R shows the ring gear 5. As shown in FIG. 2(B), if the distance between the planetary gear carrier C and the ring gear R is made $r_1$, the distance between the planetary gear carrier C and the sun gear S is made $r_2$, and the speeds of the sun gear S, planetary gear carrier C, and ring gear R are shown by the black dots, the points showing the speeds are positioned on the line shown by the broken line $Z_1$.

On the other hand, if stopping the relative rotation of the sun gear 4, ring gear 5, and planet gears 6 to make the planetary gear carrier 7 rotate in the forward direction, the sun gear 4, ring gear 5, and planetary gear carrier 7 will rotate in the forward direction by the same rotational speed. The relationship of the speeds at this time is shown by the broken line $Z_2$. Therefore, the relationship of the actual speeds is expressed by the solid line Z obtained by superposing the broken line $Z_1$ on the broken line $Z_2$, therefore, the points showing the speeds of the sun gear S, planetary gear carrier C, and ring gear R are positioned on the line shown by the solid line Z. Therefore, when any two speeds of the sun gear S, planetary gear carrier C, and ring gear R are determined, the remaining single speed is automatically determined. Note that, if using the above-mentioned relationship of $r_1/r_2 = \rho$, as shown in FIG. 2(B), the distance between the sun gear C and the planetary gear carrier C and the distance between the planetary gear carrier C and the ring gear R become 1:$\rho$.

FIG. 2(C) illustrates the speeds of the sun gear S, planetary gear carrier C, and ring gear R and the torques acting on the sun gear S, planetary gear carrier C, and ring gear R. The ordinate and abscissa of FIG. 2(C) are the same as in FIG. 2(B). Further, the solid line shown in FIG. 2(C) corresponds to the solid line shown in FIG. 2(B). On the other hand, FIG. 2(C) shows the torques acting on the corresponding shafts at the black dots showing the speeds. Note that, when the direction of action of the torque and the direction of rotation are the same at each torque, this shows the case where a drive torque is given to the corresponding shaft, while when the direction of action of the torque and the direction of rotation are opposite, this shows the case where a torque is given to the corresponding shaft.

Now, in the example shown in FIG. 2(C), the planetary gear carrier C is acted upon by the engine torque Te. This engine torque Te is split into the torque Ter applied to the ring gear R and the torque Tes applied to the sun gear S. The shaft 10 of the ring gear R is acted upon by the split engine torque Ter, the torque $Tm_2$ of the motor generator MG2, and the vehicle drive torque Tr for driving the vehicle. These torques Ter, $Tm_2$, and Tr are balanced. In the case shown in FIG. 2(C), the torque $Tm_2$ is one where the direction of action of the torque and the direction of rotation are the same, so this torque $Tm_2$ gives a drive torque to the shaft 10 of the ring gear R. Therefore, at this time, the motor generator MG2 is operated as a drive motor. In the case shown in FIG. 2(C), the sum of the engine torque Ter split at this time and the drive torque $Tm_2$ by the motor generator MG2 becomes equal to the vehicle drive torque Tr. Therefore, at this time, the vehicle is driven by the engine 1 and the motor generator MG2.

On the other hand, the shaft 8 of the sun gear 5 is acted upon by the split engine torque Tes and the torque $Tm_1$ of the motor generator MG1. These torques Tes and $Tm_1$ are balanced. In the case shown in FIG. 2(C), the torque $Tm_1$ is one where the direction of action of the torque and the direction of rotation are opposite, so this torque $Tm_1$ becomes the drive torque given from the shaft 10 of the ring gear R. Therefore, at this time, the motor generator MG1 operates as a generator. That is, the split engine torque Tes becomes equal to the torque for driving the motor generator MG1. Therefore, at this time, the motor generator MG1 is driven by the engine 1.

In FIG. 2(C), Nr, Ne, and Ns respectively show the speeds of the shaft 10 of the ring gear R, the shaft of the planetary gear carrier C, that is, the drive shaft 9, and the shaft 8 of the sun gear S. Therefore, the relationship of the speeds of the shafts 8, 9, and 10 and the relationship of the torques acting on the shafts 8, 9, and 10 will be clear at a glance from FIG. 2(C).

FIG. 2(C) is called a "nomogram". The solid line shown in FIG. 2(C) is called an "operational line".

Now, as shown in FIG. 2(C), if the vehicle drive torque is Tr and the speed of the ring gear 5 is Nr, the vehicle drive output Pr for driving the vehicle is expressed by Pr=Tr·Nr. Further, the output Pe of the engine 1 at this time is expressed by a product Te·Ne of the engine torque Te and the engine speed Ne. On the other hand, at this time, a generation energy of the motor generator MG1 is similarly expressed by a product of the torque and speed. Therefore, the generation energy of the motor generator MG1 becomes $Tm_1$·Ns. Further, the drive energy of the motor generator MG2 is also expressed by a product of the torque and speed. Therefore, the drive energy of the motor generator MG2 becomes $Tm_2$—Nr. Here, if assuming the generation energy $Tm_1$·Ns of the motor generator MG1 is made equal to the drive energy $Tm_2$·Nr of the motor generator MG2 and the power generated by the motor generator MG1 is used to drive the motor generator MG2, the total output Pe of the engine 1 is used by the vehicle drive output Pr. At this time, Pr=Pe, therefore, Tr·Nr=Te·Ne. That is, the engine torque Te is converted to the vehicle drive torque Tr. Therefore, the output regulating system 2 performs a torque conversion action. Note that, in actuality, there is generation loss and gear transmission loss, so the total output Pe of the engine 1 cannot be used for the vehicle drive output Pr, but the output regulating system 2 still performs a torque conversion action.

FIG. 3(A) shows equivalent output lines $Pe_1$ to $Pe_9$ of the engine 1. Among the magnitudes of the outputs, there is the relationship $Pe_1 < Pe_2 < Pe_3 < Pe_4 < Pe_5 < Pe_6 < Pe_7 < Pe_8 < Pe_9$. Note that, the ordinate of FIG. 3(A) shows the engine torque Te, while the abscissa of FIG. 3(A) shows the engine speed Ne. As will be understood from FIG. 3(A), there are innumerable combinations of the engine torque Te and the engine speed Ne satisfying the required output Pe of the engine 1 requested for driving the vehicle. In this case, no matter which combination of the engine torque Te and the engine speed Ne is selected, it is possible to convert the engine torque Te to the vehicle drive torque Tr at the output regulating system 2. Therefore, if using this output regulating system 2, it becomes possible to set a desired combination of the engine torque Te and the engine speed Ne giving a same engine output Pe. In the present invention, as explained later, a combination of the engine torque Te and the engine speed Ne able to secure the required output Pe of the engine 1 and obtain the best fuel consumption is set. The relationship shown in FIG. 3(A) is stored in advance in the ROM 22.

FIG. 3(B) shows the equivalent accelerator opening degree lines of the accelerator pedal 27, that is, the equivalent depression lines L. The depression amounts L are shown as percentages with respect to the equivalent depression lines L. Note that, the ordinate of the FIG. 3(B) shows the required vehicle drive torque TrX requested for driving the vehicle, while the abscissa of FIG. 3(B) shows the speed Nr of the ring gear 5. From FIG. 3(B), it will be understood that the required vehicle drive torque TrX is determined from the amount of depression L of the accelerator pedal 27 and the speed Nr of the ring gear 5 at that time. The relationship shown in FIG. 3(B) is stored in advance in the ROM 22.

Next, referring to FIG. 4, the basic control routine for operating a vehicle will be explained. Note that, this routine is executed by interruption at predetermined time intervals.

Figure 4:
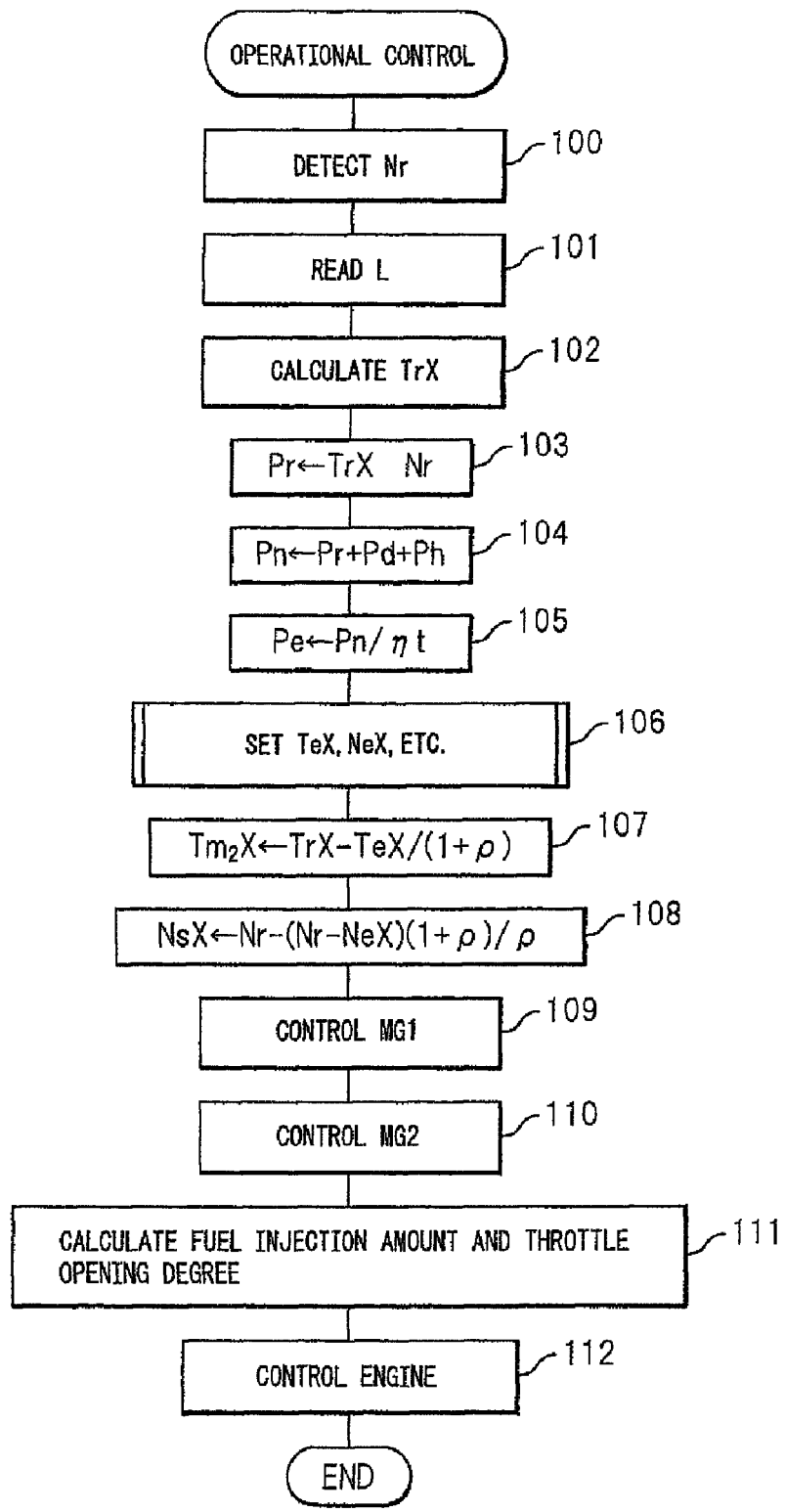
FIG. 4 is a flowchart for operational control of a vehicle.

Referring to FIG. 4, first, at step 100, the speed Nr of the ring gear 5 is detected. Next, at step 101, the amount of depression L of the accelerator pedal 27 is read. Next, at step 102, the required vehicle drive torque TrX is calculated from the relationship shown in FIG. 3(B). Next, at step 103, the speed Nr of the ring gear 5 is multiplied with the required vehicle drive torque TrX to calculate the required vehicle drive output Pr (=TrX·Nr). Next, at step 104, the required vehicle drive output Pr is added with the engine output Pd to be increased or decreased for charging or discharging the battery 19 and the engine output Ph required for driving auxiliaries to calculate the output Pn required from the engine 1. Note that, the engine output Pd for charging and discharging the battery 19 is calculated by a routine shown in the later explained FIG. 5(B).

Next, at step 105, the output Pr required by the engine 1 is divided by the efficiency ηt of the torque conversion at the output regulating system 2 so as to calculate the final required output Pe of the engine 1 (=Pn/ηt). Next, at step 106, from the relationship shown in FIG. 3(A), the required engine torque TeX and the required engine speed NeX etc. satisfying the required output of the engine Pe and giving the minimum fuel consumption are set. The required engine torque TeX and the required engine speed NeX etc. are set by a routine shown in the later explained FIG. 24 and FIG. 28. Note that, in the present invention, the "minimum fuel consumption" means the minimum fuel consumption when considering not only the efficiency of the engine 1, but also the gear transmission efficiency of the output regulating system 2 etc.

Next, at step 107, the required torque $Tm_2X$ of the motor generator MG2 ('TrX-Ter=TrX-TeX/(1+ρ)) is calculated from the required vehicle drive torque TrX and the required engine torque TeX. Next, at step 108, the required speed NsX of the sun gear 4 is calculated from the speed Nr of the ring gear 5 and the required engine speed NeX. Note that, from the relationship shown in FIG. 2(C), (NeX−Ns):(Nr−NeX)=1:ρ, so the required speed NsX of the sun gear 4 is expressed by Nr−(Nr−NeX)·(1−ρ)/ρ as shown by step 108 of FIG. 4.

Next, at step 109, the motor generator MG1 is controlled so that the speed of the motor generator MG1 becomes the required speed NsX. If the speed of the motor generator MG1 becomes the required speed NsX, the engine speed Ne becomes the required engine speed NeX and therefore the engine speed Ne is controlled by the motor generator MG1 to the required engine speed NeX. Next, at step 110, the motor generator MG2 is controlled so that the torque of the motor generator MG2 becomes the required torque $Tm_2X$. Next, at step 111, the amount of fuel injection required for obtaining the required engine torque TeX and the opening degree of the throttle valve targeted are calculated. At step 112, the engine 1 is controlled based on these.

In this regard, in a hybrid type vehicle, it is necessary to maintain the stored charge of the battery 19 at a constant amount or more at all time. Therefore, in the embodiment according to the present invention, as shown in FIG. 5(A), the stored charge SOC is maintained between a lower limit value $SC_1$ and an upper limit value $SC_2$. That is, in the embodiment according to the present invention, if the stored charge SOC falls below the lower limit value $SC_1$, the engine output is forcibly raised so as to increase the amount of power generation. If the stored charge SOC exceeds the upper limit value $SC_2$, the engine output is forcibly reduced so as to increase the amount of power consumption by the motor generator. Note that, the stored charge SOC is for example calculated by cumulatively adding the charging and discharging current I of the battery 19.

FIG. 5(B) shows a control routine for charging and discharging the battery 19. This routine is executed by interruption at predetermined time intervals.

Referring to FIG. 5(B), first, at step 120, the stored charge SOC is added with the charging and discharging current I of the battery 19. This current value I is made plus at the time of charging and is made minus at the time of discharge. Next, at step 121, it is judged if the battery 19 is in the middle of being forcibly charged. When not in the middle of being forcibly charged, the routine proceeds to step 122 where it is judged if the stored charge SOC has fallen lower than the lower limit value $SC_1$. If $SOC<SC_1$, the routine proceeds to step 124 where the engine output Pd at step 104 of FIG. 4 is made a predetermined value $Pd_1$. At this time, the engine output is forcibly increased and the battery 19 is forcibly charged. If the battery 19 is forcibly charged, the routine proceeds from step 121 to step 123 where it is judged if the forced charging action has been completed. The routine proceeds to step 124 until the forced charging action has been completed.

On the other hand, when it is judged at step 122 that $SOC \geq SC_1$, the routine proceeds to step 125 where it is judged if the battery 19 is in the middle of being forcibly discharged. When not in the middle of being forcibly discharged, the routine proceeds to step 126 where it is judged if the stored charge SOC has exceeded the upper limit value $SC_2$. If $SOC>SC_2$, the routine proceeds to step 128 where the engine output Pd at step 104 of FIG. 4 is made the predetermined value-$Pd_2$. At this time, the engine output is forcibly reduced and the battery 19 is forcibly discharged. If the battery 19 is forcibly discharged, the routine proceeds from step 125 to step 127 where it is judged if the forced discharging action has been completed or not. The routine proceeds to step 128 until the forced discharging action ends.

Next, a spark ignition type internal combustion engine shown in FIG. 1 will be explained with reference to FIG. 6.

Figure 6:
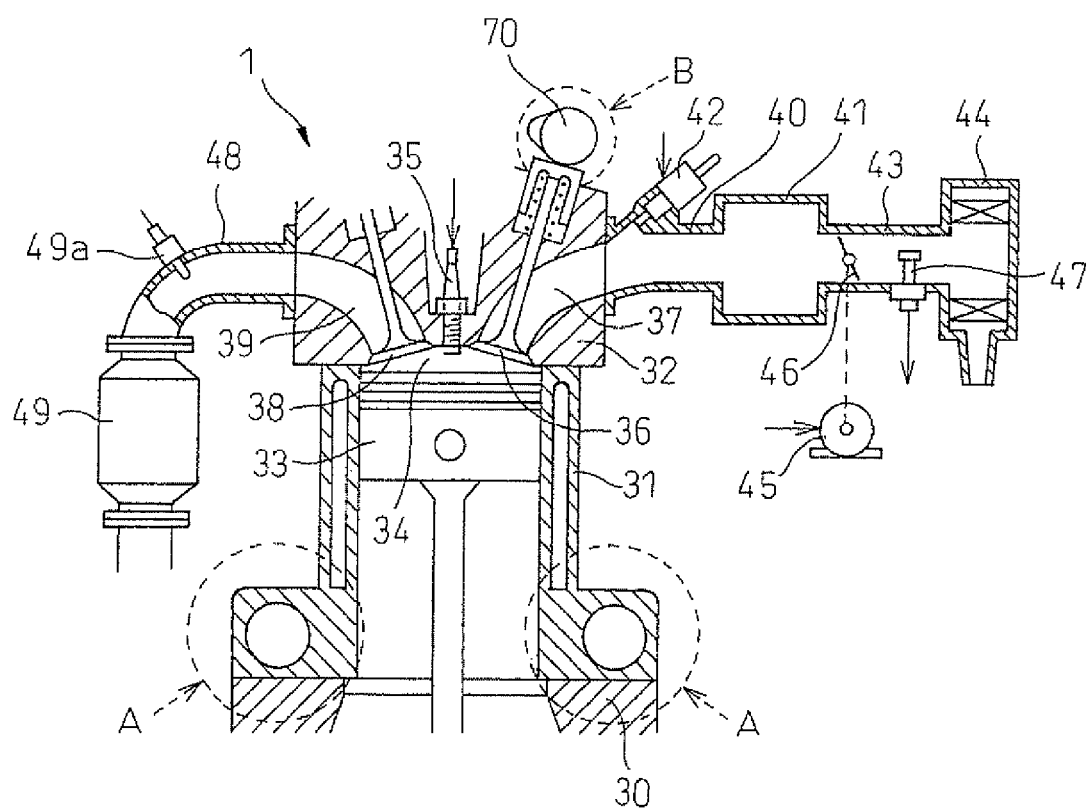
FIG. 6 is an overview of the engine shown in FIG. 1.

Referring to FIG. 6, 30 indicates a crank case, 31a cylinder block, 32 a cylinder head, 33 a piston, 34 a combustion chamber, 35 a spark plug arranged at the top center of the combustion chamber 34, 36 an intake valve, 37 an intake port, 38 an exhaust valve, and 39 an exhaust port. The intake port 37 is connected through an intake branch tube 40 to a surge tank 41, while each intake branch tube 40 is provided with a fuel injector 42 for injecting fuel toward a corresponding intake port 37. Note that each fuel injector 42 may be arranged at each combustion chamber 34 instead of being attached to each intake branch tube 40.

The surge tank 41 is connected through an intake duct 43 to an air cleaner 44, while the intake duct 43 is provided inside it with a throttle valve 46 driven by an actuator 45 and an intake air amount detector 47 using for example a hot wire. On the other hand, the exhaust port 39 is connected through an exhaust manifold 48 to a catalytic converter 49 housing for example a three-way catalyst, while the exhaust manifold 48 is provided inside it with an air-fuel ratio sensor 49a.

On the other hand, in the embodiment shown in FIG. 6, the connecting part of the crank case 30 and the cylinder block 31 is provided with a variable compression ratio mechanism A able to change the relative positions of the crank case 30 and cylinder block 31 in the cylinder axial direction so as to change the volume of the combustion chamber 34 when the piston 33 is positioned at compression top dead center, and there is further provided with a variable valve timing mechanism able to control the closing timing of the intake valve 7 to control an intake air amount actually fed into the combustion chamber 34.

Figure 7:
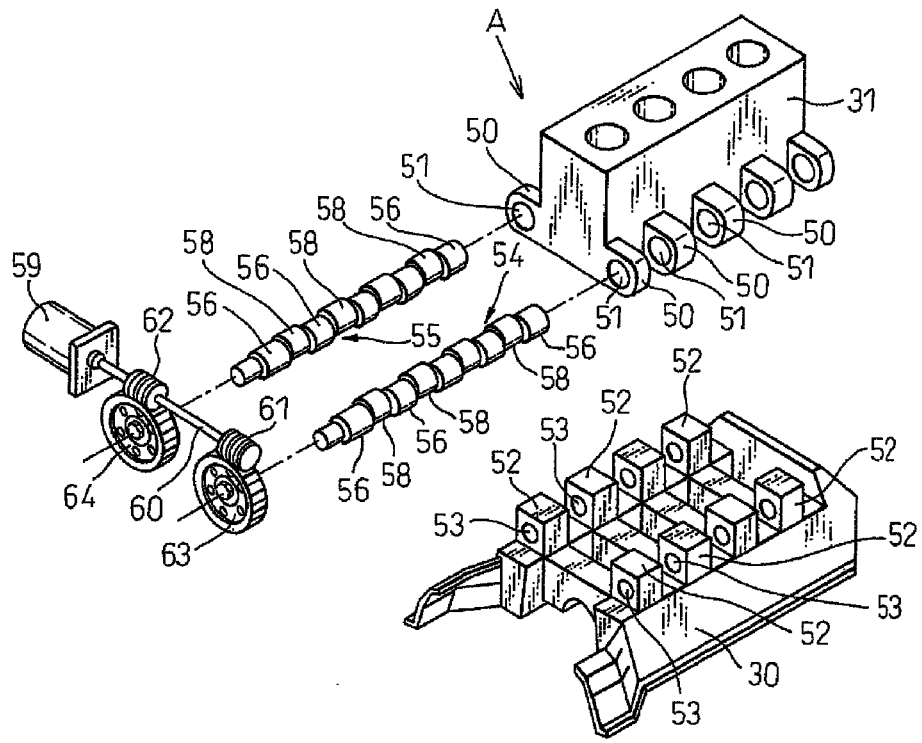
FIG. 7 is a disassembled perspective view of a variable compression ratio mechanism.
Figure 8:
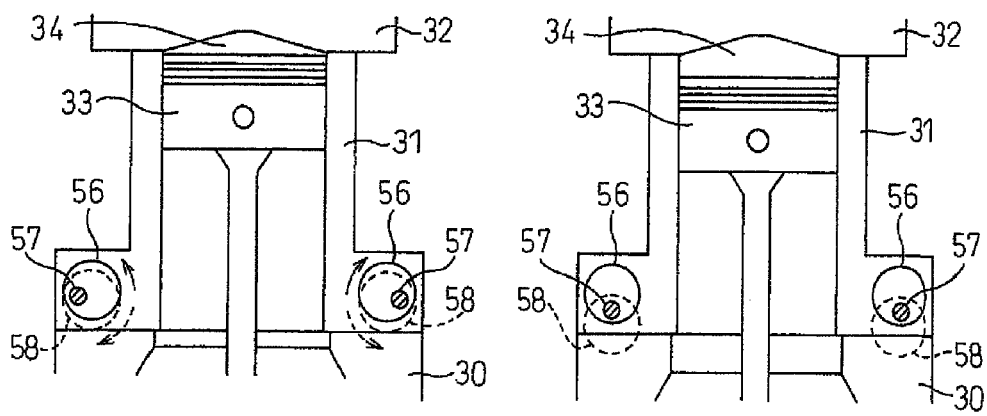
FIG. 8 is a side cross-sectional view of an engine shown schematically.

FIG. 7 is a disassembled perspective view of the variable compression ratio mechanism A shown in FIG. 6, while FIG. 8 is a side cross-sectional view of the illustrated internal combustion engine 1. Referring to FIG. 7, at the bottom of the two side walls of the cylinder block 31, a plurality of projecting parts 50 separated from each other by a certain distance are formed. Each projecting part 50 is formed with a circular cross-section cam insertion hole 51. On the other hand, the top surface of the crank case 30 is formed with a plurality of projecting parts 52 separated from each other by a certain distance and fitting between the corresponding projecting parts 50. These projecting parts 52 are also formed with circular cross-section cam insertion holes 53.

As shown in FIG. 7, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 8, extend eccentric shafts 57 arranged eccentrically with respect to the axes of rotation of the cam shafts 54, 55. Each eccentric shaft 57 has other circular cams 58 rotatably attached to it eccentrically. As shown in FIG. 7, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 8(A) from the state shown in FIG. 8(A), the eccentric shafts 57 move toward the bottom center, so the circular cams 58 rotate in the opposite directions from the circular cams 56 in the cam insertion holes 53 as shown by the broken line arrows in FIG. 8(A). As shown in FIG. 8(B), when the eccentric shafts 57 move toward the bottom center, the centers of the circular cams 58 move to below the eccentric shafts 57.

As will be understood from a comparison of FIG. 8(A) and FIG. 8(B), the relative positions of the crank case 30 and cylinder block 31 are determined by the distance between the centers of the circular cams 56 and the centers of the circular cams 58. The larger the distance between the centers of the circular cams 56 and the centers of the circular cams 58, the further the cylinder block 31 from the crank case 31. If the cylinder block 31 moves away from the crank case 30, the volume of the combustion chamber 34 when the piston 33 is positioned as compression top dead center increases, therefore by making the cam shafts 54, 55 rotate, the volume of the combustion chamber 34 when the piston 33 is positioned as compression top dead center can be changed.

As shown in FIG. 7, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 34 when the piston 33 is positioned at compression top dead center over a broad range. Note that the variable compression ratio mechanism A shown from FIG. 6 to FIG. 8 shows an example. Any type of variable compression ratio mechanism may be used.

Figure 9:
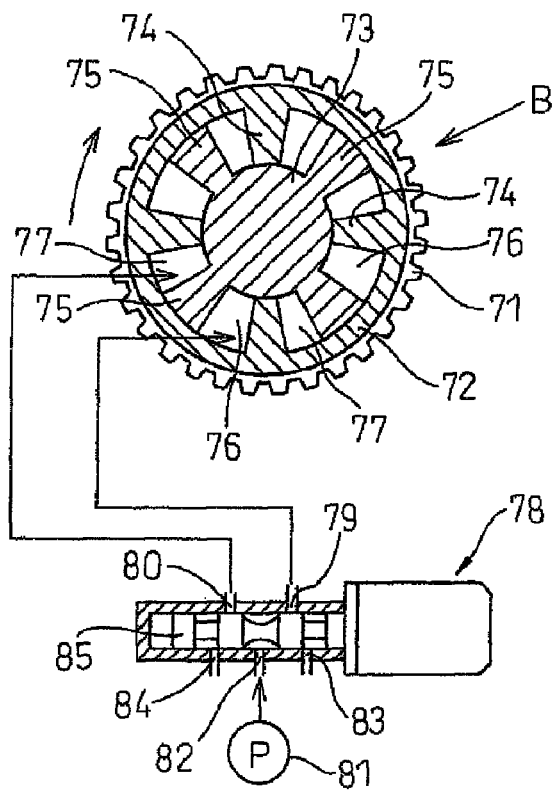
FIG. 9 is a view showing a variable valve timing mechanism.

On the other hand, FIG. 9 shows a variable valve timing mechanism B attached to the end of the cam shaft 70 for driving the intake valve 36 in FIG. 6. Referring to FIG. 9, this variable valve timing mechanism B is provided with a timing pulley 71 rotated by the output shaft 9 of the engine 1 through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84 and a spool valve 85 for controlling connection and disconnection of the ports 79, 80, 82, 83, 84.

To advance the phase of the cams of the intake valve drive cam shaft 70, in FIG. 9, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 9, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 9, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 10:
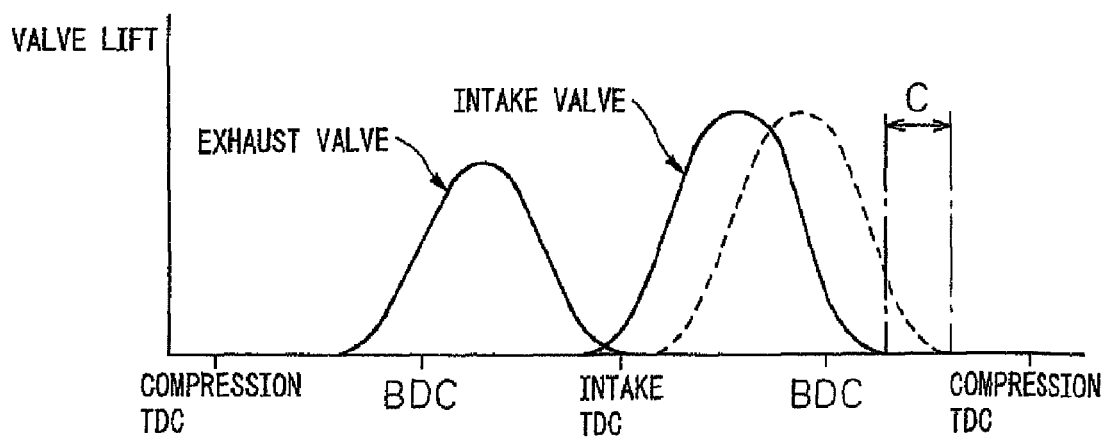
FIG. 10 is a view showing amounts of lift of an intake valve and an exhaust valve.

In FIG. 10, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 36 can be freely set between the range shown by the solid line in FIG. 10 and the range shown by the broken line, therefore the closing timing of the intake valve 36 can be set to any crank angle in the range shown by the arrow C in FIG. 10.

The variable valve timing mechanism B shown in FIG. 6 and FIG. 9 is one example. For example, a variable valve timing mechanism or other various types of variable valve timing mechanisms able to change only the closing timing of the intake valve while maintaining the opening timing of the intake valve constant can be used.

Next, the meaning of the terms used in the present application will be explained with reference to FIG. 11. Note that FIGS. 11(A), (B), and (C) show for explanatory purposes an engine with a volume of the combustion chambers of 50 ml and a stroke volume of the piston of 500 ml. In these FIGS. 11(A), (B), and (C), the combustion chamber volume shows the volume of the combustion chamber when the piston is at compression top dead center.

FIG. 11(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 11(A), this mechanical compression ratio becomes (50 ml+500 ml)/50 ml=11.

FIG. 11(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+ actual stroke volume)/combustion chamber volume. That is, as shown in FIG. 11(B), even if the piston starts to rise in the compression stroke, no compression action is performed while the intake valve is opened. The actual compression action is started after the intake valve closes.

Therefore, the actual compression ratio is expressed as follows using the actual stroke volume. In the example shown in FIG. 11(B), the actual compression ratio becomes (50 ml+450 ml)/50 ml=10.

FIG. 11(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 11(C), this expansion ratio becomes (50 ml+500 ml)/50 ml=11.

Next, a superhigh expansion ratio cycle used in the present invention will be explained with reference to FIG. 12 and FIG. 13. Note that FIG. 12 shows the relationship between the theoretical thermal efficiency and the expansion ratio, while FIG. 13 shows a comparison between the ordinary cycle and superhigh expansion ratio cycle used selectively in accordance with the load in the present invention.

FIG. 13(A) shows the ordinary cycle when the intake valve closes near the bottom dead center and the compression action by the piston is started from near substantially compression bottom dead center. In the example shown in this FIG. 13(A) as well, in the same way as the examples shown in FIGS. 11(A), (B), and (C), the combustion chamber volume is made 50 ml, and the stroke volume of the piston is made 500 ml. As will be understood from FIG. 13(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 12:
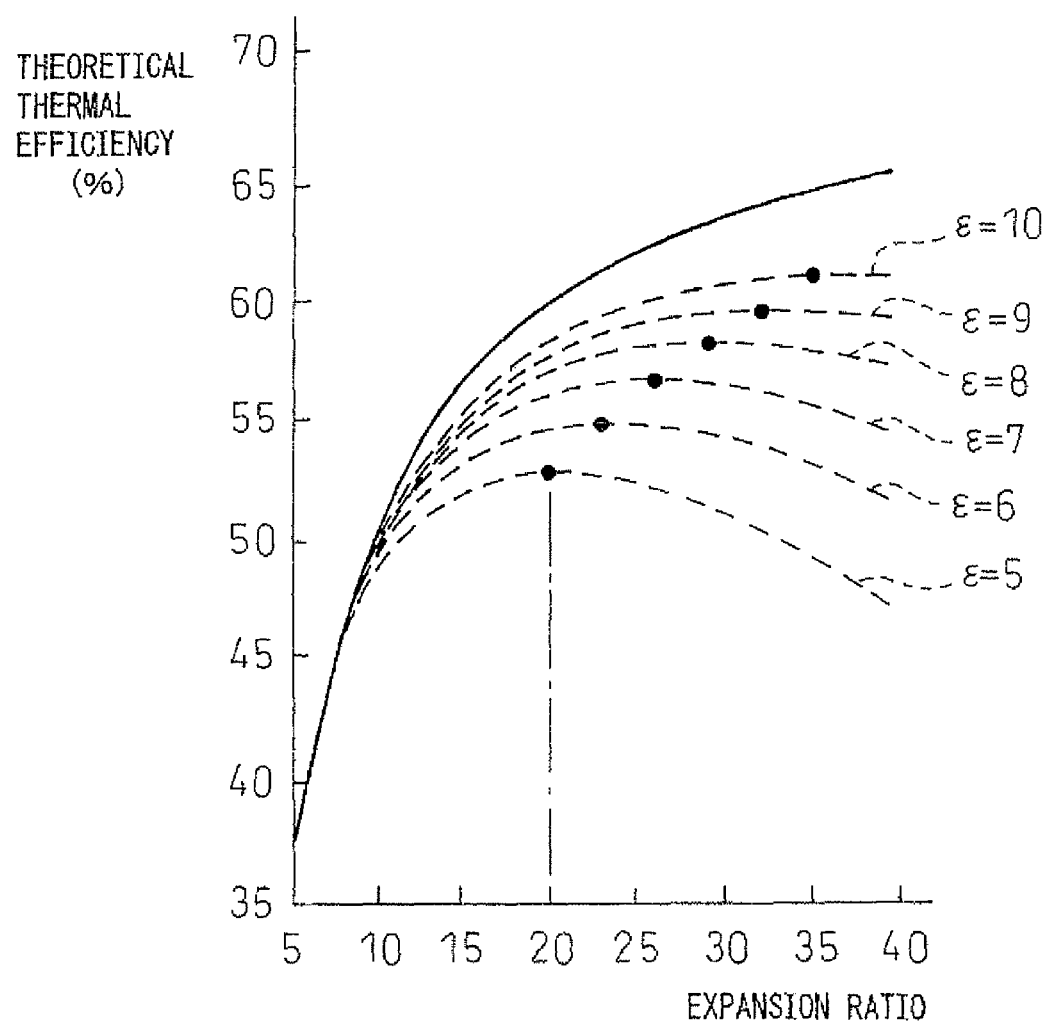
FIG. 12 is a view showing a relationship between a theoretical thermal efficiency and the expansion ratio.
Figure 13:
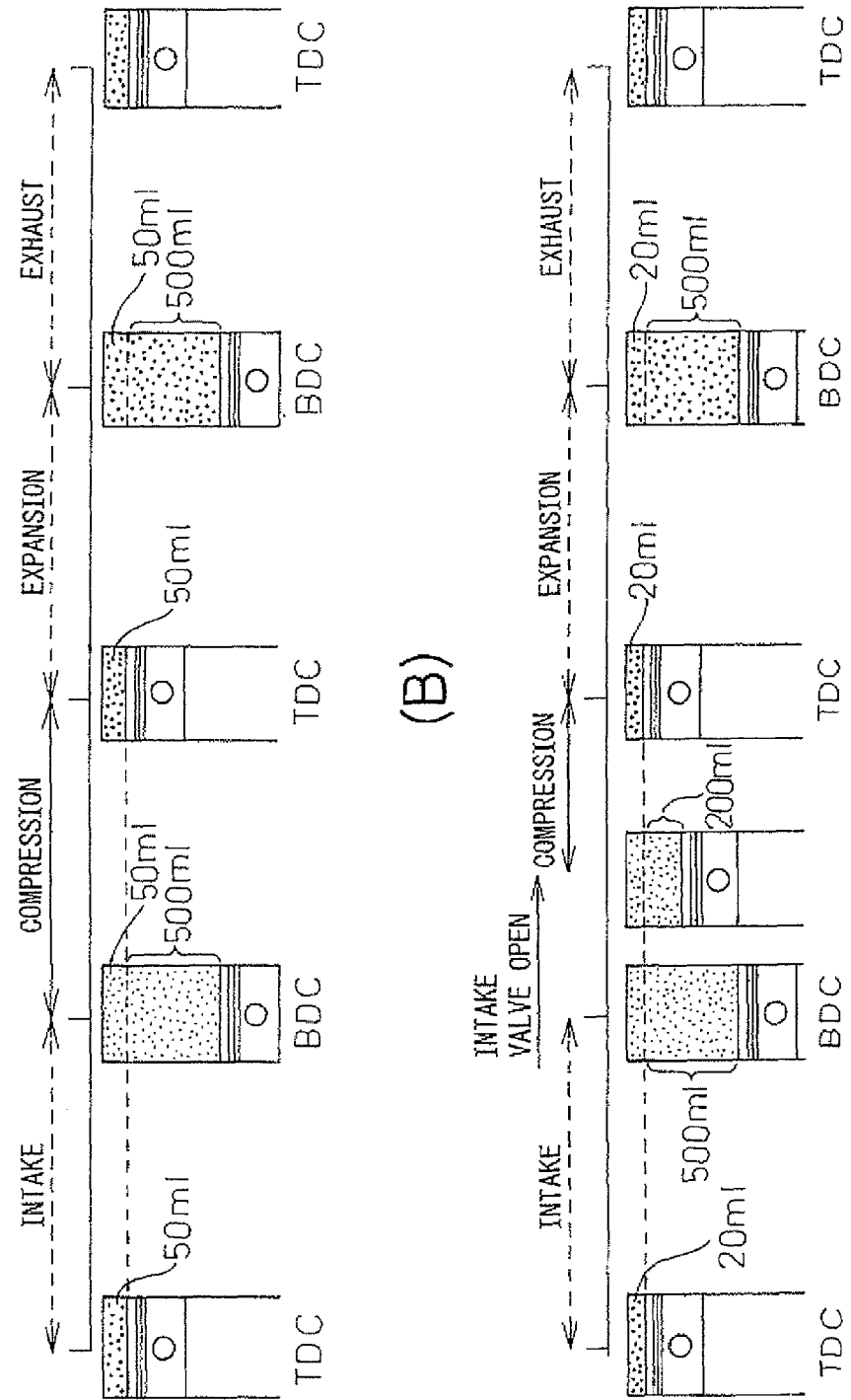
FIG. 13 is a view explaining a normal cycle and superhigh expansion ratio cycle.

The solid line in FIG. 12 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, it is studied how to raise the theoretical thermal efficiency while strictly differentiating between the mechanical compression ratio and actual compression ratio and as a result it is discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken lines in FIG. 12 show the theoretical thermal efficiency in the case of fixing the actual compression ratios at 5, 6, 7, 8, 9, 10, respectively, and raising the expansion ratios in that state. Note that in FIG. 12, black dottes indicate the peak positions of the theoretical thermal efficiency when the actual compression ratios $\epsilon$ are made 5, 6, 7, 8, 9, 10. It is learned from FIG. 12 that the amount of rise of the theoretical thermal efficiency when raising the expansion ratio in the state where the actual compression ratio $\epsilon$ is maintained at a low value of for example 10 and the amount of rise of the theoretical thermal efficiency in the case where the actual compression ratio $\epsilon$ is increased along with the expansion ratio as shown by the solid line of FIG. 12 will not differ that much.

If the actual compression ratio $\epsilon$ is maintained at a low value in this way, knocking will not occur, therefore if raising the expansion ratio in the state where the actual compression ratio $\epsilon$ is maintained at a low value, the occurrence of knocking can be prevented and the theoretical thermal efficiency can be greatly raised. FIG. 13(B) shows an example of the case when using the variable compression ratio mechanism A and variable valve timing mechanism B to maintain the actual compression ratio c at a low value and raise the expansion ratio.

Referring to FIG. 13(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 13(A), as explained above, the actual compression ratio is about 11 and the expansion ratio is 11. Compared with this case, in the case shown in FIG. 13(B), it is learned that only the expansion ratio is raised to 26. This is the reason that it is called the "superhigh expansion ratio cycle".

As explained above, if increasing the expansion ratio, the theoretical thermal efficiency is improved and the fuel consumption is improved. Therefore, the expansion ratio is preferably raised in as broad an operating region as possible. However, as shown in FIG. 13(B), in the superhigh expansion ratio cycle, since the actual piston stroke volume at the time of the compression stroke is made smaller, the amount of intake air taken into the combustion chamber 34 becomes smaller. Therefore, this superhigh expansion ratio cycle can only be employed when the amount of intake air supplied into the combustion chamber 34 is small, that is, when the required engine torque Te is low. Therefore, in the embodiment according to the present invention, when the required engine torque Te is low, the superhigh expansion ratio cycle shown in FIG. 13(B) is employed, while when the required engine torque Te is high, the normal cycle shown in FIG. 13(A) is employed.

Next, referring to FIG. 14, how the engine 1 is controlled in accordance with the required engine torque Te will be explained.

Figure 14:
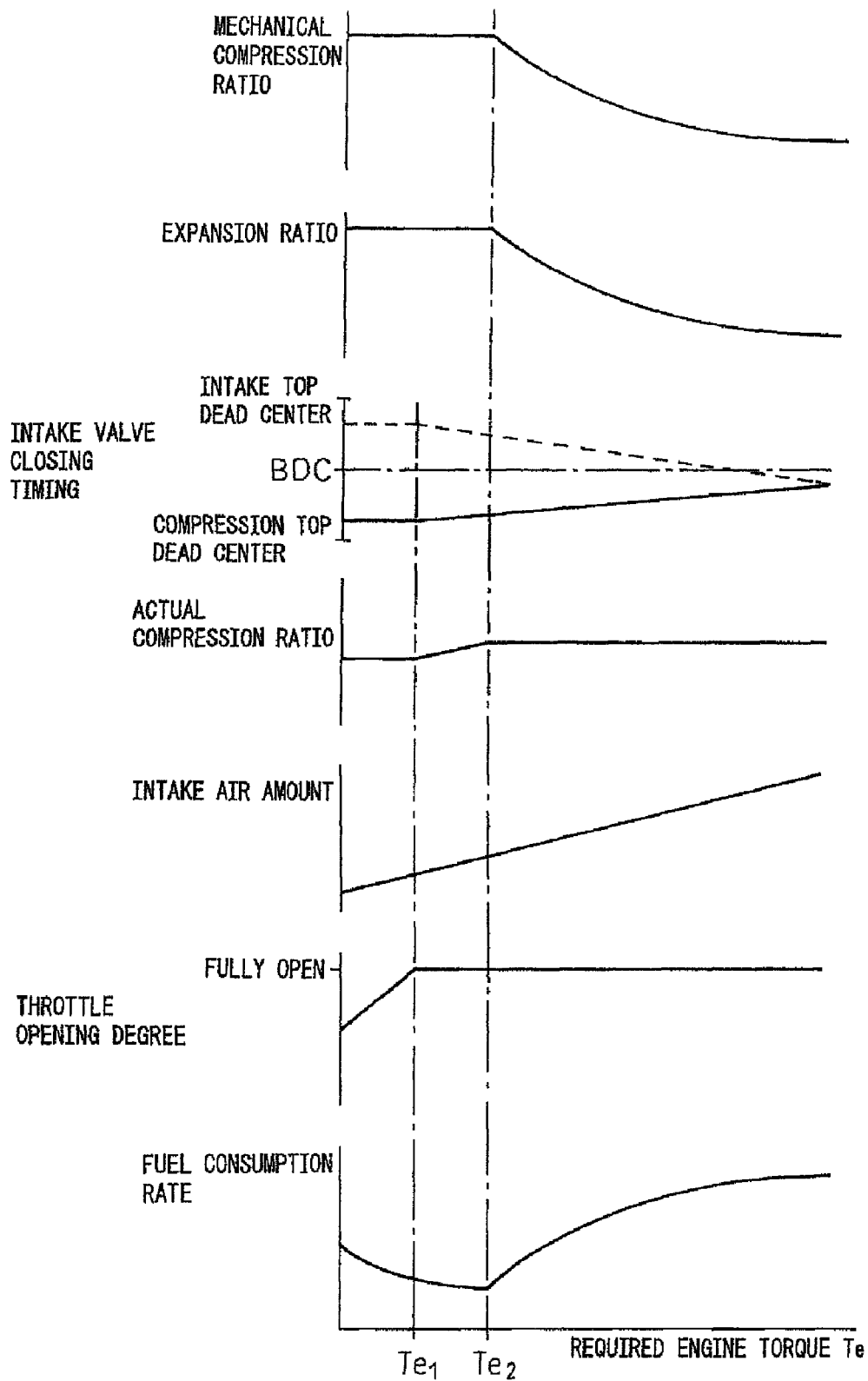
FIG. 14 is a view showing changes in the mechanical compression ratio in accordance with the engine torque etc.

FIG. 14 shows the changes in the mechanical compression ratio, expansion ratio, the closing timing of the intake valve 36, the actual compression ratio, the intake air amount, the opening degree of the throttle valve 46, and the fuel consumption rate in accordance with the required engine torque Te. The fuel consumption rate shows the amount of fuel consumption when the vehicle runs a predetermined running distance by a predetermined running mode. Therefore, the value showing the fuel consumption rate becomes smaller the better the fuel consumption rate. Note that, in the embodiment according to the present invention, usually the average air-fuel ratio in the combustion chamber 34 is feedback controlled based on the output signal of the air-fuel ratio sensor 49a to a stoichiometric air-fuel ratio so that a three-way catalyst of a catalytic converter 49 can simultaneously reduce the unburnt HO, CO, and $NO_X$ in the exhaust gas. FIG. 12 shows the theoretical thermal efficiency when the average air-fuel ratio in the combustion chamber 34 is made the stoichiometric air-fuel ratio in this way.

On the other hand, in this way, in the embodiment according to the present invention, the average air-fuel ratio in the combustion chamber 34 is controlled to the stoichiometric air-fuel ratio, so the engine torque Te becomes proportional to the amount of intake air supplied into the combustion chamber 34. Therefore, as shown in FIG. 14, the more the required engine torque Te falls, the more the intake air amount is reduced. Therefore, to reduce the intake air amount the more the required engine torque Te falls, as shown by the solid line in FIG. 14, the closing timing of the intake valve 36 is retarded. The throttle valve 46 is held in the fully open state while the intake air amount is controlled by retarding the closing timing of the intake valve 36 in this way. On the other hand, if the required engine torque Te becomes lower than a certain value $Te_1$, it is no longer possible to control the intake air amount to the required intake air amount by controlling the closing timing of the intake valve 36. Therefore, when the required engine torque Te is lower than this value $Te_1$, the limit value $Te_1$, the closing timing of the intake valve 36 is held at the limit closing timing at the time of the limit value $Te_1$. At this time, the intake air amount is controlled by the throttle valve 46.

On the other hand, as explained above, when the required engine torque Te is low, the superhigh expansion ratio cycle is employed, therefore, as shown in FIG. 14, when the required engine torque Te is low, the mechanical compression ratio is raised, whereby the expansion ratio is made higher. In this regard, as shown in FIG. 12, when for example the actual compression ratio ε is made 10, the theoretical thermal efficiency peaks when the expansion ratio is 35 or so. Therefore, when the required engine torque Te is low, it is preferable to raise the mechanical compression ratio until the expansion ratio becomes 35 or so. However, it is difficult to raise the mechanical compression ratio until the expansion ratio becomes 35 or so due to structural restrictions. Therefore, in the embodiment according to the present invention, when the required engine torque Te is low, the mechanical compression ratio is made the structurally possible maximum mechanical compression ratio so that as high an expansion ratio as possible is obtained.

On the other hand, if the closing timing of the intake valve 36 is advanced so that the intake air amount is increased in the state maintaining the mechanical compression ratio at the maximum mechanical compression ratio, the actual compression ratio becomes higher. However, the actual compression ratio has to be maintained at 12 or less even at the maximum. Therefore, when the required engine torque Te becomes high and the intake air amount is increased, the mechanical compression ratio is lowered so that the actual compression ratio is maintained at the optimum actual compression ratio. In the embodiment according to the present invention, as shown in FIG. 14, when the required engine torque Te exceeds the limit value $Te_2$, the mechanical compression ratio is lowered as the required engine torque Te increases so that the actual compression ratio is maintained at the optimum actual compression ratio.

If the required engine torque Te becomes higher, the mechanical compression ratio is lowered to the minimum mechanical compression ratio. At this time, the cycle becomes the normal cycle shown in FIG. 13(A).

In this regard, in the embodiment according to the present invention, when the engine speed Ne is low, the actual compression ratio ε is made 9 to 11. However, if the engine speed Ne becomes higher, the air-fuel mixture in the combustion chamber 34 is disturbed, so knocking occurs less easily. Therefore, in the embodiment according to the present invention, the higher the engine speed Ne, the higher the actual compression ratio ε.

On the other hand, in the embodiment according to the present invention, the expansion ratio when made the superhigh expansion ratio cycle is made 26 to 30. On the other hand, in FIG. 12, the actual compression ratio ε=5 shows the lower limit of the practically feasible actual compression ratio. In this case, the theoretical thermal efficiency peaks when the expansion ratio is about 20. The expansion ratio where the theoretical air-fuel ratio peaks becomes higher than 20 as the actual compression ratio ε becomes larger than 5. Therefore, if considering the practically feasible actual compression ratio c, it can be said that the expansion ratio is preferably 20 or more. Therefore, in the embodiment according to the present invention, the variable compression ratio mechanism A is formed so that the expansion ratio becomes 20 or more.

Further, in the example shown in FIG. 14, the mechanical compression ratio is continuously changed in accordance with the required engine torque Te. However, the mechanical compression ratio can be changed in stages in accordance with the required engine torque Te.

On the other hand, as shown by the broken line in FIG. 14, as the required engine torque Te becomes lower, it is possible to control the intake air amount even by advancing the closing timing of the intake valve 36. Therefore, if expressing this so as to be able to include both the case shown by the solid line and the case shown by the broken line in FIG. 14, in the embodiment according to the present invention, the closing timing of the intake valve 36 is moved in a direction away from the intake bottom dead center BDC until the limit closing timing able to control the amount of intake air supplied into the combustion chamber 34 as the required engine torque Te becomes lower.

In this regard, if the expansion ratio becomes higher, the theoretical thermal efficiency becomes higher and the fuel consumption becomes better, that is, the fuel consumption rate becomes smaller. Therefore, in FIG. 14, when the required engine torque Te is the limit value $Te_2$ or less, the fuel consumption rate becomes smallest. However, between the limit value $Te_1$ and $Te_2$, the actual compression ratio falls as the required engine torque Te becomes lower, so the fuel consumption rate deteriorates just a bit, that is, the fuel consumption rate becomes higher. Further, in the region where the required engine torque Te is lower than the limit value $Te_1$, the throttle valve 46 is closed, so the fuel consumption rate becomes further higher. On the other hand, if the required engine torque Te becomes higher than the limit value $Te_2$, the expansion ratio falls, so the fuel consumption rate rises as the required engine torque Te becomes higher. Therefore, when the required engine torque Te is the limit value $Te_2$, that is, at the boundary of the region where the mechanical compression ratio is lowered by the increase of the required engine torque Te and the region where the mechanical compression ratio is maintained at the maximum mechanical compression ratio, the fuel consumption rate becomes the smallest.

The limit value $Te_2$ of the engine torque Te where the fuel consumption becomes the smallest changes somewhat in accordance with the engine speed Ne, but whatever the case, if able to hold the engine torque Te at the limit value $Te_2$, the minimum fuel consumption is obtained. In the present invention, the output regulating system 2 is used for maintaining the engine torque Te at the limit value $Te_e$ even if the required output Pe of the engine 1 changes.

Next, referring to FIG. 15, the method of control of the engine 1 will be explained.

Figure 15:
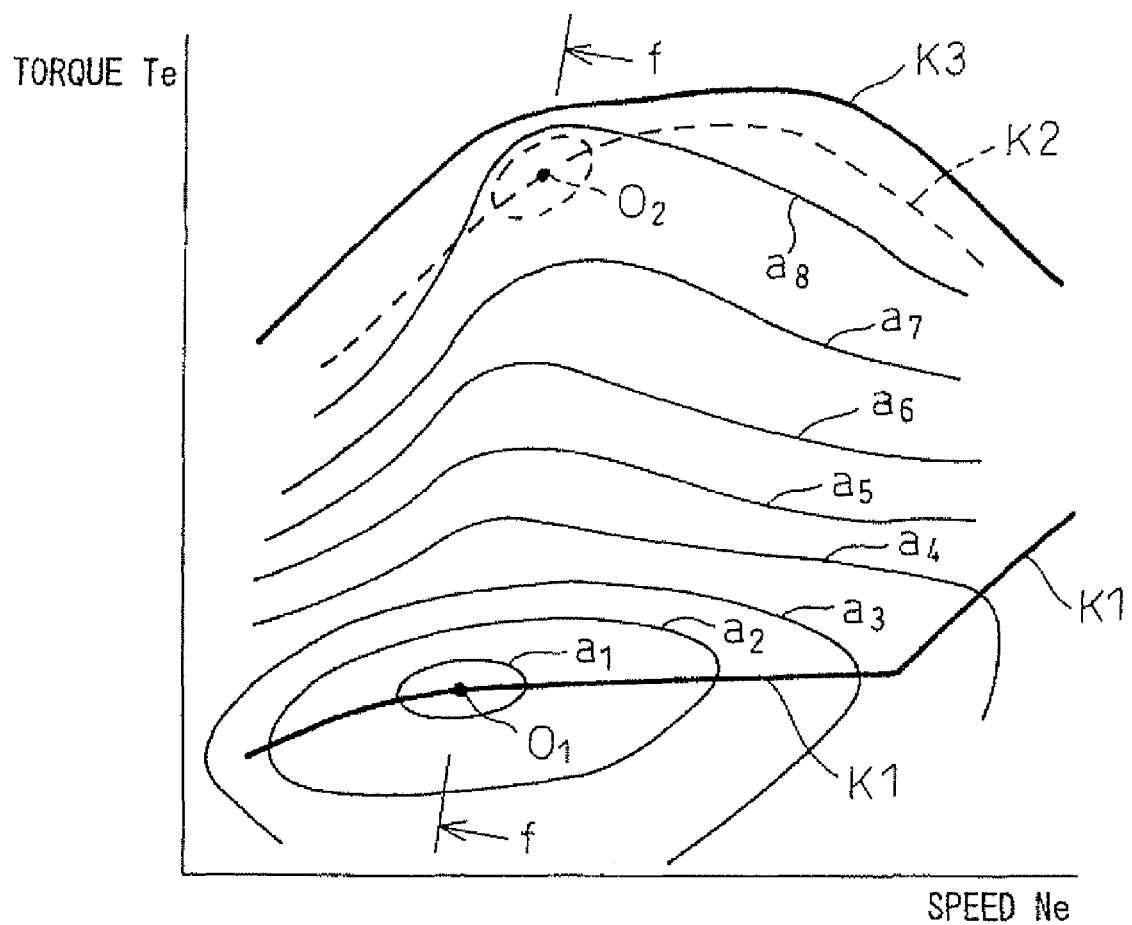
FIG. 15 is a view showing equal fuel consumption rate lines and operation lines.

FIG. 15 shows the equivalent fuel consumption rate lines $a_1$ $a_2$, $a_3$, $a_4$, $a_5$, $a_6$, $a_7$ and $a_8$ expressed two-dimensionally with the ordinate made the engine torque Te and with the abscissa made the engine speed Ne. The equivalent fuel consumption rate lines $a_1$ to $a_8$ are equivalent fuel consumption rate lines obtained when controlling the engine 1 shown in FIG. 6 as shown in FIG. 14. The more from $a_1$ to $a_8$, the higher the fuel consumption rate. That is, the inside of $a_1$ is the region of the smallest fuel consumption rate. The point $O_1$ shown in the internal region of $a_1$ is the operating state giving the smallest fuel consumption rate. In the engine 1 shown in FIG. 6, the $O_1$ point where the fuel consumption rate becomes minimum is when the engine torque Te is low and the engine speed Ne is about 2000 rpm.

In FIG. 15, the solid line K1 shows the relationship of the engine torque Te and the engine speed Ne where the engine torque Te becomes the limit value $Te_2$ shown in FIG. 14, that is, where the fuel consumption rate becomes the minimum. Therefore, if setting the engine torque Te and the engine speed Ne to an engine torque Te and an engine speed Ne on the solid line K1, the fuel consumption rate becomes minimum. Therefore, the solid line K1 is called the "minimum fuel consumption rate operation line". This minimum fuel consumption rate operation line K1 takes the form of a curve extending through the point $O_1$ in the direction of increase of the engine speed Ne.

As will be understood from FIG. 15, on the minimum fuel consumption rate operation line K1, the engine torque Te does not change much at all. Therefore, when the required output Pe of the engine 1 increases, the required output Pe of the engine 1 is satisfied by raising the engine speed Ne. On this minimum fuel consumption rate operation line K1, the mechanical compression ratio is fixed to the maximum mechanical compression ratio. The closing timing of the intake valve 36 is also fixed to the timing giving the required intake air amount.

Depending on the design of the engine, it is possible to set this minimum fuel consumption rate operation line K1 to extend straight in the direction of increase of the engine speed Ne until the engine speed Ne becomes maximum. However, when the engine speed Ne becomes high, the loss due to the increase in friction becomes larger. Therefore, in the engine 1 shown in FIG. 6, when the required output Pe of the engine 1 increases, compared with when maintaining the mechanical compression ratio at the maximum mechanical compression ratio and in that state increasing only the engine speed Ne, when increasing the engine torque Te along with the increase of the engine speed Ne, the drop in the mechanical compression ratio causes the theoretical thermal efficiency to fall, but the net thermal efficiency rises. That is, in the engine 1 shown in FIG. 6, when the engine speed Ne becomes high, the fuel consumption becomes smaller when the engine speed Ne and the engine torque Te are increased than when only the engine speed Ne is increased.

Therefore, in the embodiment according to the present invention, the minimum fuel consumption rate operation line K1, as shown by K11 in FIG. 15, extends to the high engine torque Te side along with an increase of the engine speed Ne if the engine speed Ne becomes higher. On this minimum fuel consumption rate operation line K1', the further from minimum fuel consumption rate operation line K1, the closer the closing timing of the intake valve 36 to the intake bottom dead center and the more the mechanical compression ratio is reduced from the maximum mechanical compression ratio.

Now, as explained above, in the embodiment according to the present invention, the relationship of the engine torque Te and the engine speed Ne when the fuel consumption becomes the minimum, if expressed two-dimensionally as a function of these engine torque Te and engine speed Ne, is expressed as the minimum fuel consumption rate operation line K1 forming a curve extending in the direction of increase of the engine speed Ne. To minimize the fuel consumption rate, so long as it is possible to satisfy the required output Pe of the engine 1, it is preferable to change the engine torque Te and the engine speed Ne along this minimum fuel consumption rate operation line K1.

Therefore, in the embodiment according to the present invention, so long as the required output Pe of the engine 1 can be satisfied, the engine torque Te and the engine speed Ne are changed along the minimum fuel consumption rate operation line K1 in accordance with the change in the required output Pe of the engine 1. Note that, only naturally, this minimum fuel consumption rate operation line K1 itself is not stored in advance in the ROM 22. The relationships of the engine torque Te and the engine speed Ne showing the minimum fuel consumption rate operation lines K1 and K1' are stored in advance in the ROM 22. Further, in the embodiment according to the present invention, the engine torque Te and the engine speed Ne are changed within the range of the minimum fuel consumption rate operation line K1 along the minimum fuel consumption rate operation line K1, but the range of change of the engine torque Te and the engine speed Ne may also be expanded to the minimum fuel consumption rate operation line K1'.

Next, the operation lines other than the minimum fuel consumption rate operation lines K1 and K1' will be explained.

Figure 17:
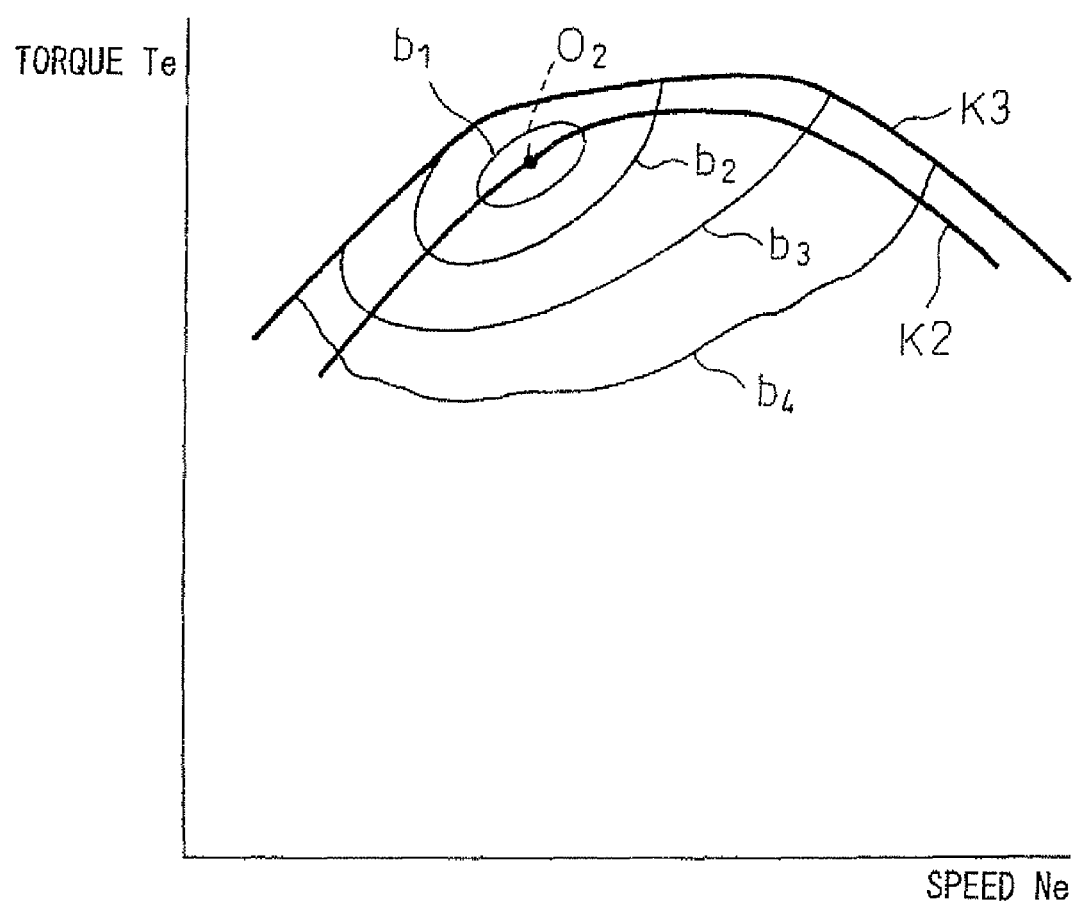
FIG. 17 is a view showing equivalent fuel consumption rate lines and operation lines.

Referring to FIG. 15, when expressed two-dimensionally as a function of the engine torque Te and the engine speed Ne, a high torque operation line shown by the broken line K2 is set at the high engine torque Te side of the minimum fuel consumption rate operation lines K1 and K1'. In actuality, the relationship of the engine torque Te and the engine speed Ne showing this high torque operation line K2 is determined in advance. This relationship is stored in advance in the ROM 22. Next, this high torque operation line K2 will be explained with reference to FIG. 17. FIG. 17 shows the equivalent fuel consumption rate lines $b_1$, $b_2$, $b_3$, and $b_4$ expressed two-dimensionally with the ordinate made the engine torque Te and the abscissa made the engine speed Ne. The equivalent fuel consumption rate lines $b_1$ to $b_4$ show the fuel consumption rate lines in the case where the engine 1 shown in FIG. 6 is operated in the state lowering the mechanical compression ratio to the lowest value in the engine 1, that is, the case of the normal cycle shown in FIG. 13(A). From $b_1$ toward $b_4$, the fuel consumption becomes higher. That is, the inside of the $b_1$ is the region of the smallest fuel consumption rate. The point shown by $O_2$ of the inside region of $b_1$ becomes the operating state of the smallest fuel consumption rate. In the engine 1 shown in FIG. 17, the $O_2$ point where the fuel consumption rate becomes the minimum is when the engine torque Te is high and the engine speed Ne is near 2400 rpm.

In the embodiment according to the present invention, the high torque operation line K2 is made the curve where the fuel consumption rate becomes the minimum when the engine 1 is operated in the state where the mechanical compression ratio is reduced to the minimum value.

Referring to FIG. 15 again, when expressed two-dimensionally as a function of the engine torque Te and the engine speed Ne, a full load operation line K3 by which full load operation is performed is set at the further higher torque side from the high torque operation line K2. The relationship between the engine torque Te and the engine speed Ne showing this full load operation line K3 is found in advance. This relationship is stored in advance in the ROM 22.

FIGS. 16(A) and (B) show the change in the fuel consumption rate and the change in the mechanical compression ratio when viewed along the line f-f of FIG. 15. As shown in FIG. 16, the fuel consumption rate becomes the minimum at the $O_1$ point on the minimum fuel consumption rate operation line K1 and becomes higher toward the point $O_2$ on the high torque operation line K2. Further, the mechanical compression ratio becomes the maximum at the point $O_1$ on the minimum fuel consumption rate operation line K1 and gradually falls toward the point $O_2$. Further, the intake air amount becomes greater the higher the engine torque Te, so the intake air amount increases from the point $O_1$ on the minimum fuel consumption rate operation line K1 toward the point $O_2$, while the closing timing of the intake valve 36 approaches the intake bottom dead center along with movement from the point $O_1$ toward the point $O_2$.

Figure 18:
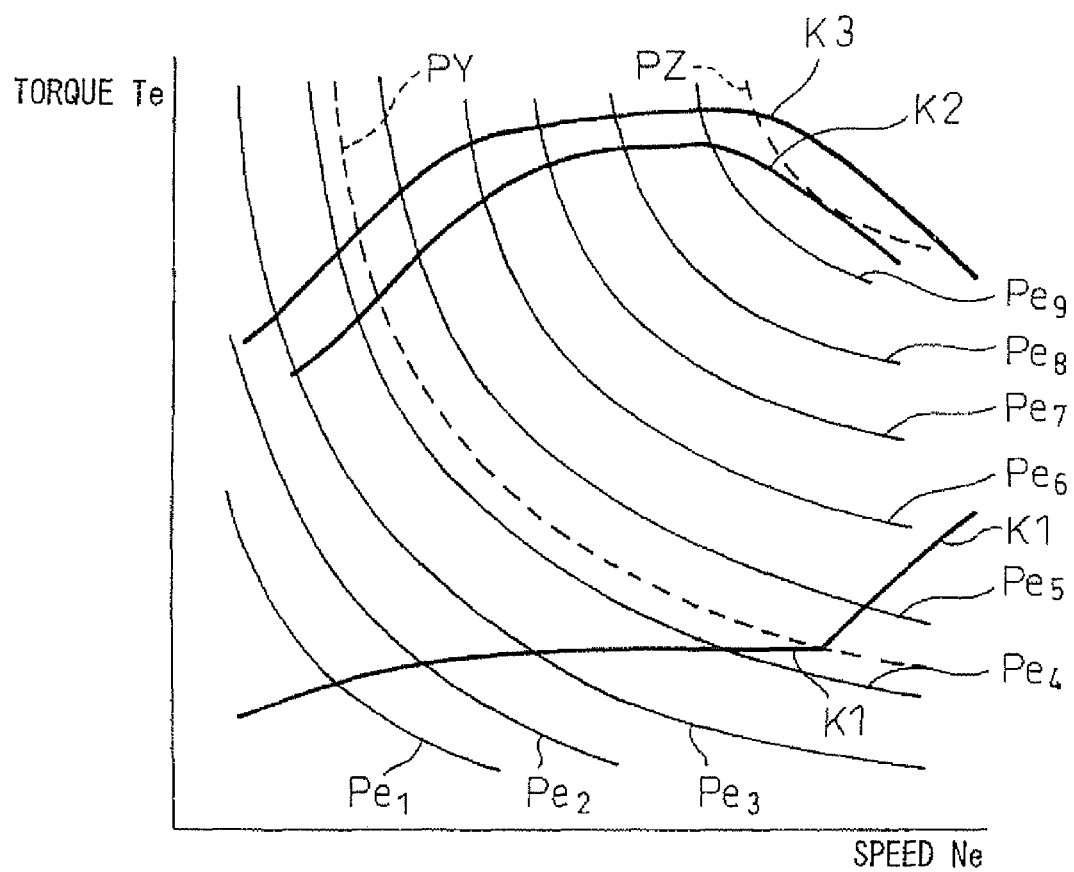
FIG. 18 is a view showing equivalent output lines and boundary outputs of an engine.

FIG. 18 shows equivalent output lines $Pe_1$ to $Pe_9$ and operation lines K1, K2, and K3 of the engine 1 shown in FIG. 3(A) and also two boundary outputs comprised of a first boundary output PY and a second boundary output PZ. As will be understood from FIG. 18, the equivalent output line of the first boundary output PY passes through the intersection of the minimum fuel consumption rate operation lines K1 and K1', while the equivalent output line of the second boundary output PZ extends so as to contact the high torque operation line K2.

Now, as explained above, in the embodiment according to the present invention, when the required output Pe of the engine 1 increases, so long as the required output Pe of the engine 1 can be satisfied, the engine torque To and the engine speed Ne are changed along the minimum fuel consumption rate operation line K1. That is, in the embodiment according to the present invention, when the required output Pe of the engine 1 is lower than the predetermined first boundary output PY, a minimum fuel consumption rate maintenance control satisfying required output of the engine by changing the engine speed in a state maintaining the mechanical compression ratio at a predetermined compression ratio or more is performed.

As opposed to this, when the required output Pe of the engine 1 is not satisfied by the engine torque To and the engine speed Ne on the minimum fuel consumption rate operation line K1, that is, the required output of the engine increases over the first boundary output PY, output increase control increasing the engine torque To after lowering the mechanical compression ratio to the predetermined compression ratio, that is, 20 or less is performed.

This output increase control is performed by controlling the closing timing of the intake valve 36 to increase the amount of intake air into the combustion chamber 34 and thereby change the engine torque Te and the engine speed Ne from points on the minimum fuel consumption rate operation line K1 in a direction increasing the engine torque Te.

Next, referring to FIG. 19 to FIG. 28, two embodiments showing the method of control of the engine torque To and the engine speed Ne will be explained. Note that, FIGS. 18, 19, 21, 22, 25, and 26 show the equivalent engine output lines $Pe_1$ to $Pe_9$, operation lines K1, K2, and K3, and boundary outputs PY and PZ, which are the same shown in FIG. 18.

Figure 19:
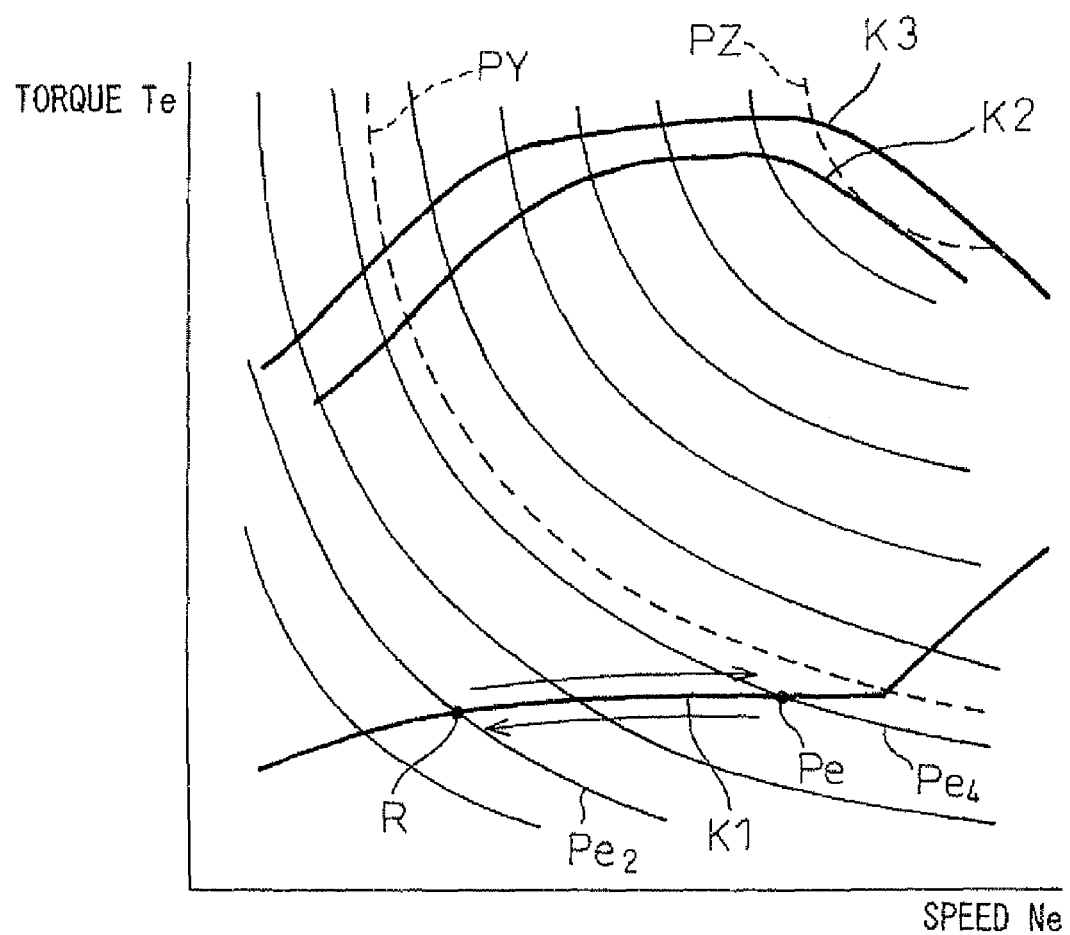
FIG. 19 shows the state of the engine torque Te and the engine speed Ne when a required output is increased or decreased.

FIG. 19 shows the case where when the output of the engine 1 is $Pe_2$ and in the operating state shown by the point R on the minimum fuel consumption rate operation line K1, the required output Pe of the engine 1 becomes $Pe_4$. In this case, the above-mentioned minimum fuel consumption rate maintenance control is performed. That is, in accordance with the change of the required output of the engine Pe, the engine torque Te and the engine speed Ne are changed as shown by the arrow mark along the minimum fuel consumption rate operation line K1 from the point R to the point Pe.

Note that, at this time, in fact, the required engine torque TeX and requested engine speed NeX at several points on the minimum fuel consumption rate operation line K1 from the point R to the point Pe are found, and the required engine torque TeX and the required engine speed NeX are successively set from among the found required engine torques TeX and required engine speeds NeX so that the engine torque Te and the engine speed Ne change along the minimum fuel consumption rate operation line K1 from the point R to the point Pe.

On the other hand, FIG. 19 also shows the case where when the output of the engine 1 is $Pe_4$ and in the operating state shown by the point Pe on the minimum fuel consumption rate operation line K1, the required output of the engine 1 becomes $Pe_2$. In this case as well, the above-mentioned minimum fuel consumption rate maintenance control is performed. That is, the engine torque Te and the engine speed Ne are changed as shown by the arrow mark along the minimum fuel consumption rate operation line K1 from the point Pe to the point R.

Figure 20:
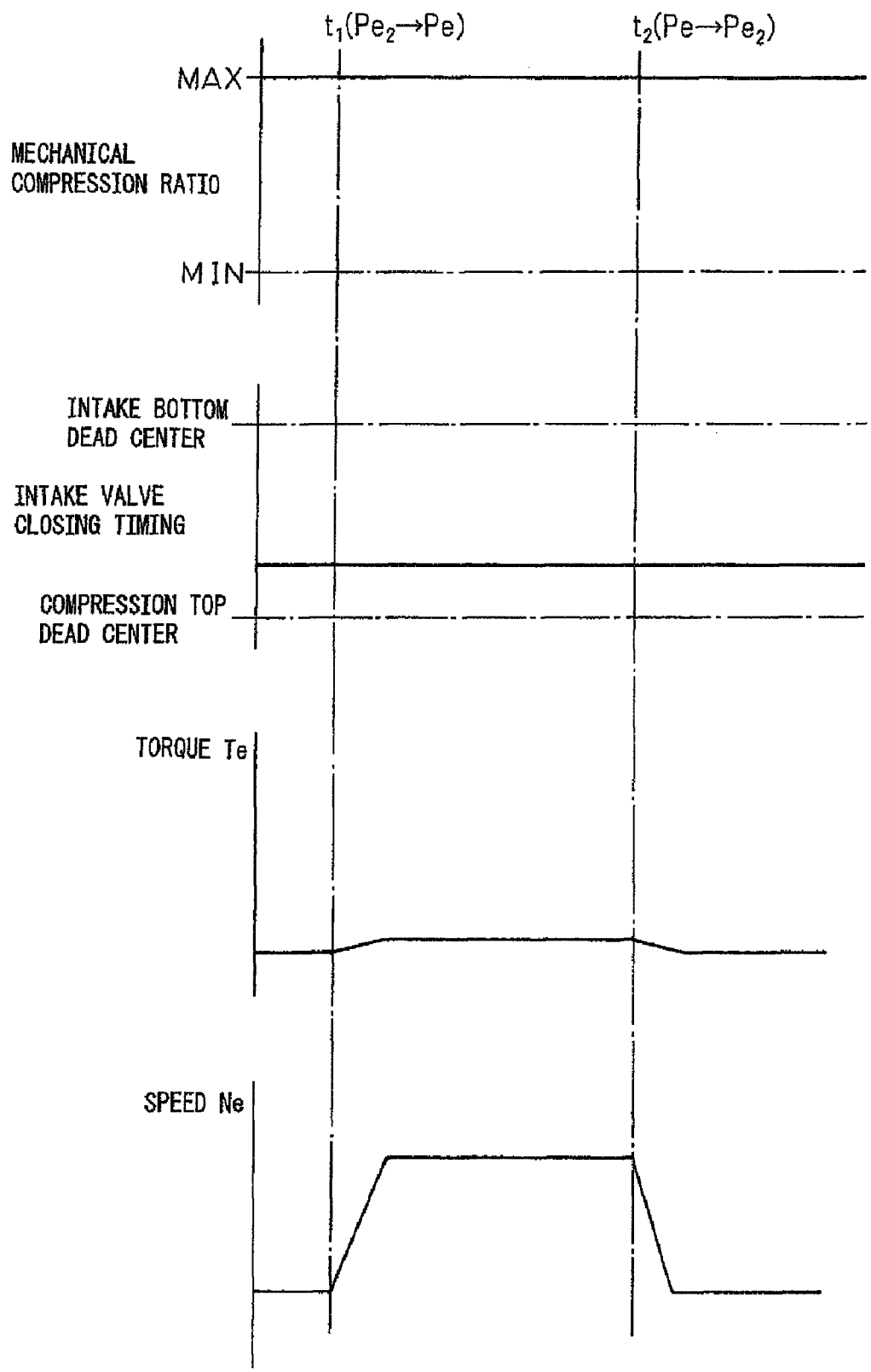
FIG. 20 is a time chart showing the changes in the mechanical compression ratio, closing timing of the intake valve, etc.

FIG. 20 shows the changes in the mechanical compression ratio, the closing timing of the intake valve 36, the engine torque Te, and the engine speed Ne when such minimum fuel consumption rate maintenance control is being performed. Note that, in FIG. 20, MAX shows the maximum mechanical compression ratio, while MIN shows the minimum mechanical compression ratio. Further, in FIG. 20, the timing $t_1$ shows when the required output of the engine changes from $Pe_2$ to Pe, while the timing $t_2$ shows when the required output of the engine changes from Pe to $Pe_2$.

As will be understood from FIG. 20, when minimum fuel consumption rate maintenance control is being performed, even if the required output of the engine changes, the mechanical compression ratio and the closing timing of the intake valve 36 will not change. As opposed to this, when the required output of the engine changes from $Pe_2$ to Pe, the engine speed Ne increases, while when the required output of the engine changes from Pe to $Pe_2$, the engine speed Ne is reduced. At this time, the engine torque Te does not change much at all.

Figure 21:
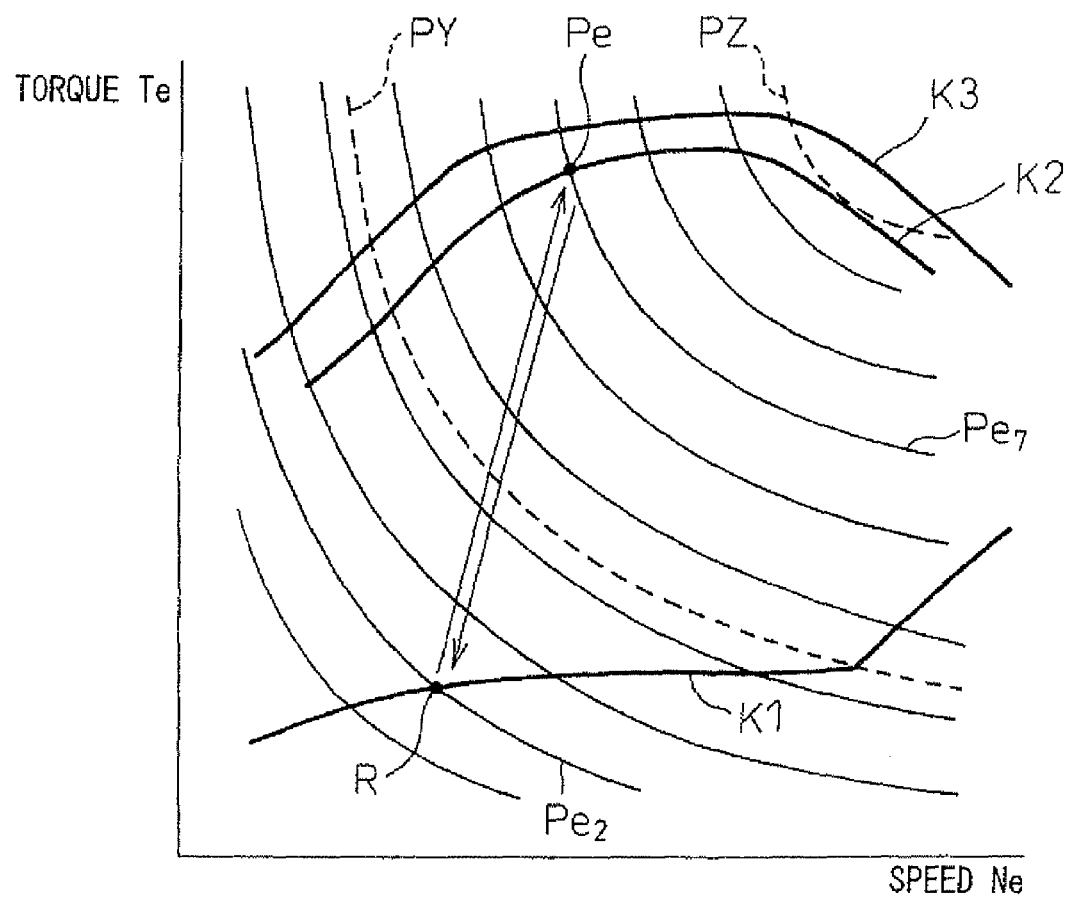
FIG. 21 is view showing the state of changes in the engine torque Te and the engine speed Ne when a required output of the engine is increased or decreased.

FIG. 21 shows the case where when the output of the engine 1 is $Pe_2$ and in the operating state shown by the point R on the minimum fuel consumption rate operation line K1, an acceleration operation is performed and the required output Pe of the engine 1 becomes $Pe_7$. In this case, the required output Pe of the engine 1 is higher than the first boundary output PY, so output increase control is performed. That is, first, the mechanical compression ratio is lowered, next, the engine torque Te and the engine speed Ne are increased from the point R on the minimum fuel consumption rate operation line K1 to the point Pe on the high torque operation line K2 where the output of the engine becomes the required output $Pe_7$.

In this case, the required engine torque TeX and required engine speed NeX at several points on the straight line R-Pe connecting the point R on the minimum fuel consumption rate operation line K1 and the point Pe on the high torque operation line K2 are found, and the required engine torque TeX and the required engine speed NeX are successively set from among the found required engine torques TeX and required engine speeds NeX so that the engine torque Te and the engine speed Ne change along this straight line R-Pe from the point R to the point Pe.

On the other hand, when in the state shown by the point Pe on the high torque operation line K2, if the required output of the engine becomes $Pe_2$, as shown in FIG. 21, the engine torque Te and the engine speed Ne are reduced from the point Pe on the high torque operation line K2 along the straight line R-Pe until the point R on the minimum fuel consumption rate operation line K1 where the output of the engine becomes the required output $Pe_2$.

Figure 22:
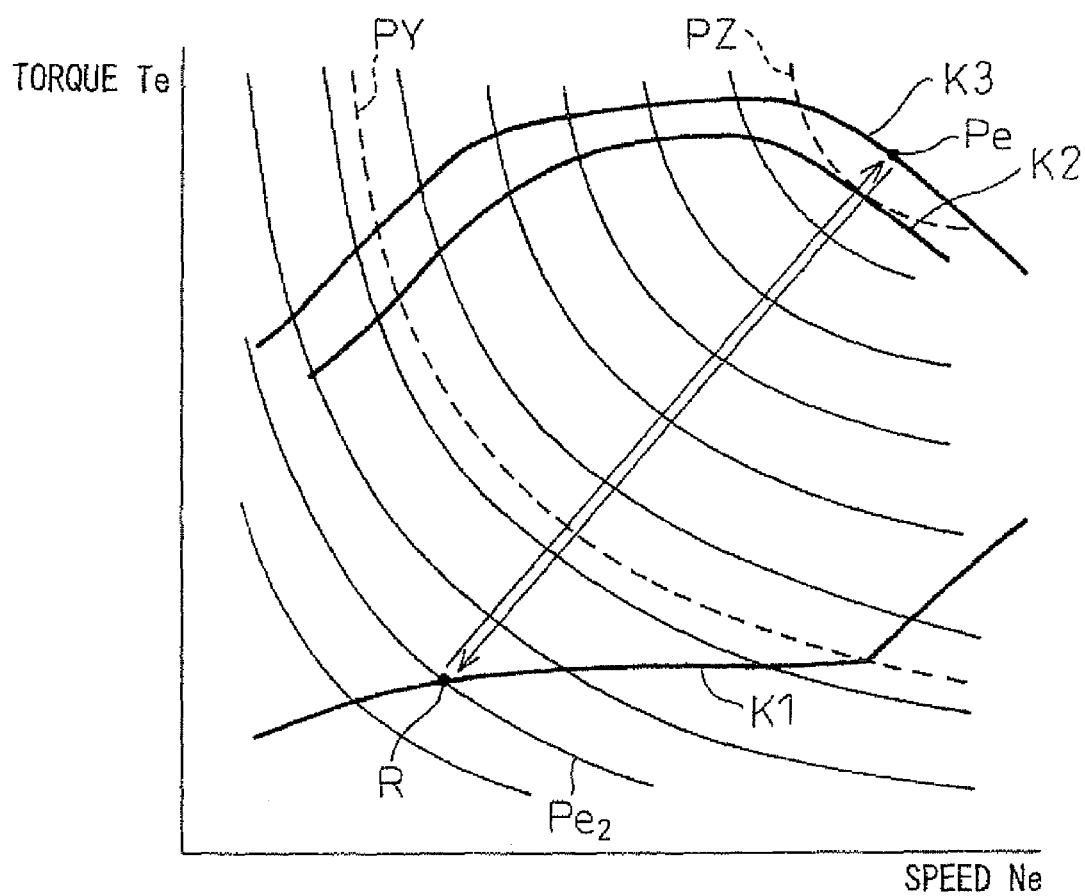
FIG. 22 is view showing the state of changes in the engine torque Te and the engine speed Ne when a required output of the engine is increased or decreased.

FIG. 22 shows the case where when the output of the engine 1 is $Pe_2$ and in the operating state shown by the point R on the minimum fuel consumption rate operation line K1, an acceleration operation is performed and the required output Pe of the engine 1 exceeds the second boundary output PZ, in particular the case where the required output Pe of the engine 1 becomes the maximum output. In this case, first, the mechanical compression ratio is reduced, next, the engine torque Te and the engine speed Ne are increased from the point R on the minimum fuel consumption rate operation line K1 to the point Pe on the full load operation line K3 where the output of the engine becomes the required output Pe along the straight line R-Pe connecting the point R on the minimum fuel consumption rate operation line K1 to the point Pe on the full load operation line K3.

On the other hand, when in the state shown by the point Pe on the full output operation line K3, if the required output of the engine becomes $Pe_2$, as shown in FIG. 22, the engine torque Te and the engine speed Ne are reduced from the point Pe on the full load operation line K3 to the point R on the minimum fuel consumption rate operation line K1 where the output of the engine becomes the required output $Pe_2$ along the straight line R-Pe.

Figure 23:
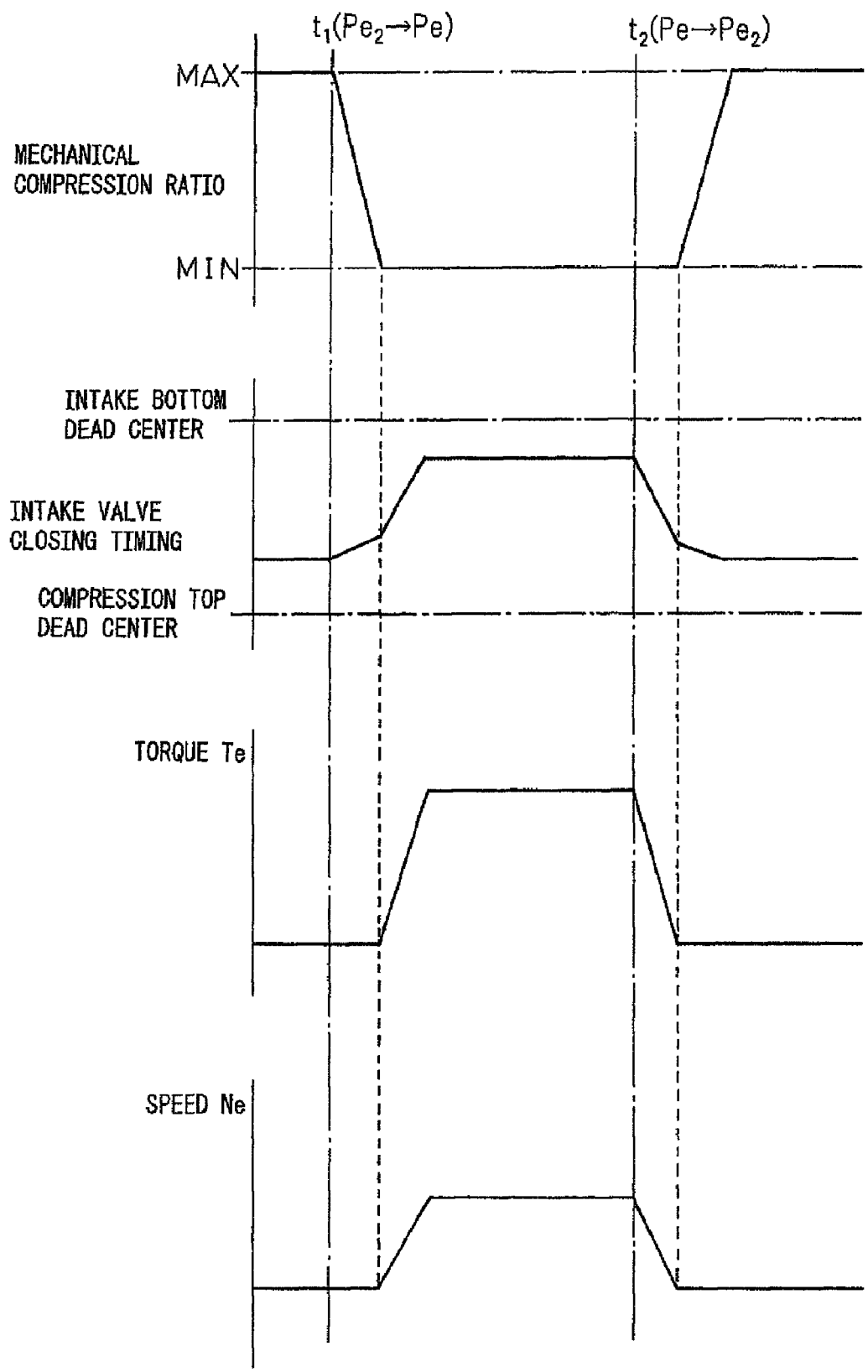
FIG. 23 is a time chart showing the changes in the mechanical compression ratio, closing timing of the intake valve, etc.

FIG. 23 shows changes in the mechanical compression ratio, the closing timing of the intake valve 36, the engine torque Te, and the engine speed Ne when the output increase control shown in FIG. 21 and FIG. 22 is performed. Note that, in FIG. 23 as well, the timing $t_1$ shows when the required output of the engine changes from $Pe_2$ to Pe, while the timing $t_2$ shows when the required output of the engine changes from Pe to $Pe_2$.

As shown in FIG. 23, when the required output of the engine changes from $Pe_2$ to Pe, first the mechanical compression ratio is reduced. After the action for reducing the mechanical compression ratio is completed, the closing timing of the intake valve 34 is made to approach the intake bottom dead center, that is, the intake air amount is increased, whereby the engine torque Te and the engine speed Ne are increased. In this case, in actuality, the target mechanical compression ratio for when the engine torque Te and the engine speed Ne are on the high torque operation line K2 is preset. When output increase control is performed, the mechanical compression ratio is lowered to this target mechanical compression ratio, then the engine torque Te and the engine speed Ne are changed from values on the minimum fuel consumption rate operation line K1 to values on the high torque operation line K2.

As explained above, in the embodiment according to the present invention, the high torque operation line K2 is a curve where when the engine is operated in the state where the mechanical compression ratio is lowered to the minimum value, the fuel consumption becomes the minimum. Therefore, in the embodiment according to the present invention, the target mechanical compression ratio is made the minimum mechanical compression ratio. Therefore, in the embodiment according to the present invention, when output increase control is performed, the mechanical compression ratio is reduced from the maximum mechanical compression ratio MAX to the minimum mechanical compression ratio.

Reducing the mechanical compression ratio takes time. Therefore, if making closing timing of the intake valve 34 approach the intake bottom dead center to increase the intake air amount immediately when the required output of the engine is increased, the action for reducing the mechanical compression ratio will not be able to keep up, so the actual compression ratio will end up becoming extremely high. As a result, knocking will occur. Therefore, in the present invention, in this way, to prevent knocking from occurring, first the mechanical compression ratio is reduced when the required output of the engine increases.

If the mechanical compression ratio falls, the actual compression ratio falls. At this time, to prevent the actual compression ratio from falling too much, in the embodiment according to the present invention, as shown in FIG. 23, as the mechanical compression ratio falls, the closing timing of the intake valve 34 approaches the intake bottom dead center little by little. When the mechanical compression ratio becomes the minimum mechanical compression ratio MIN, the closing timing of the intake valve 34 is rapidly made to approach the intake bottom dead center to increase the engine torque Te and the engine speed Ne. Note that, when the action for increasing the required output required from the vehicle at the time of acceleration operation is not covered by the action for increasing the engine output, the shortage in the engine output is made up for by the increase in output of the motor generator MG1.

On the other hand, when the required output of the engine changes from Pe to $Pe_2$ at the timing $t_2$, the closing timing of the intake valve 34 is moved in a direction away from the intake bottom dead center and the engine torque Te and the engine speed Ne are lowered. Next, when the output of the engine becomes $Pe_2$, the mechanical compression ratio is increased from the minimum mechanical compression ratio MIN to the maximum mechanical compression ratio MAX. The closing timing of the intake valve 34 is made to move in a direction away from the intake bottom dead center, then the mechanical compression ratio is increased in this way so as to prevent the occurrence of knocking.

After output increase control such as shown in FIG. 21 is performed and the engine torque Te and the engine speed Ne reach values on the high torque operation line K2, the engine torque Te and the engine speed Ne are changed along the high torque operation line K2 so long as the required output of the engine is the first boundary output PY or more.

Further, after output increase control such as shown in FIG. 22 is performed and the engine torque Te and the engine speed Ne reach values on the full load operation line K3, the engine torque Te and the engine speed Ne are changed along the full load operation line K3 so long as the required output of the engine is the second boundary output PZ or more.

That is, in the embodiment according to the present invention, the engine torque Te and the engine speed Ne are normally maintained at values on the operation lines K1, K2, and K3. With the exception of the time of output increase control etc., the engine torque Te and the engine speed Ne are not maintained between the operation lines K1 and K2 or the operation lines K2 and K3. For example, if the engine torque Te and the engine speed Ne are maintained at any values between the operation lines K1 and K2, the mechanical compression ratio is frequently switched and the durability of the variable compression ratio mechanism A becomes a problem.

As opposed to this, as in the embodiment of the present invention, if not maintaining the engine torque Te and the engine speed Ne among the operation lines K1, K2, and K3 but maintaining them on the operation lines K1, K2, and K3, the frequency of switching the mechanical compression ratio is greatly reduced and therefore durability of the variable compression ratio mechanism A can be secured.

Figure 24:
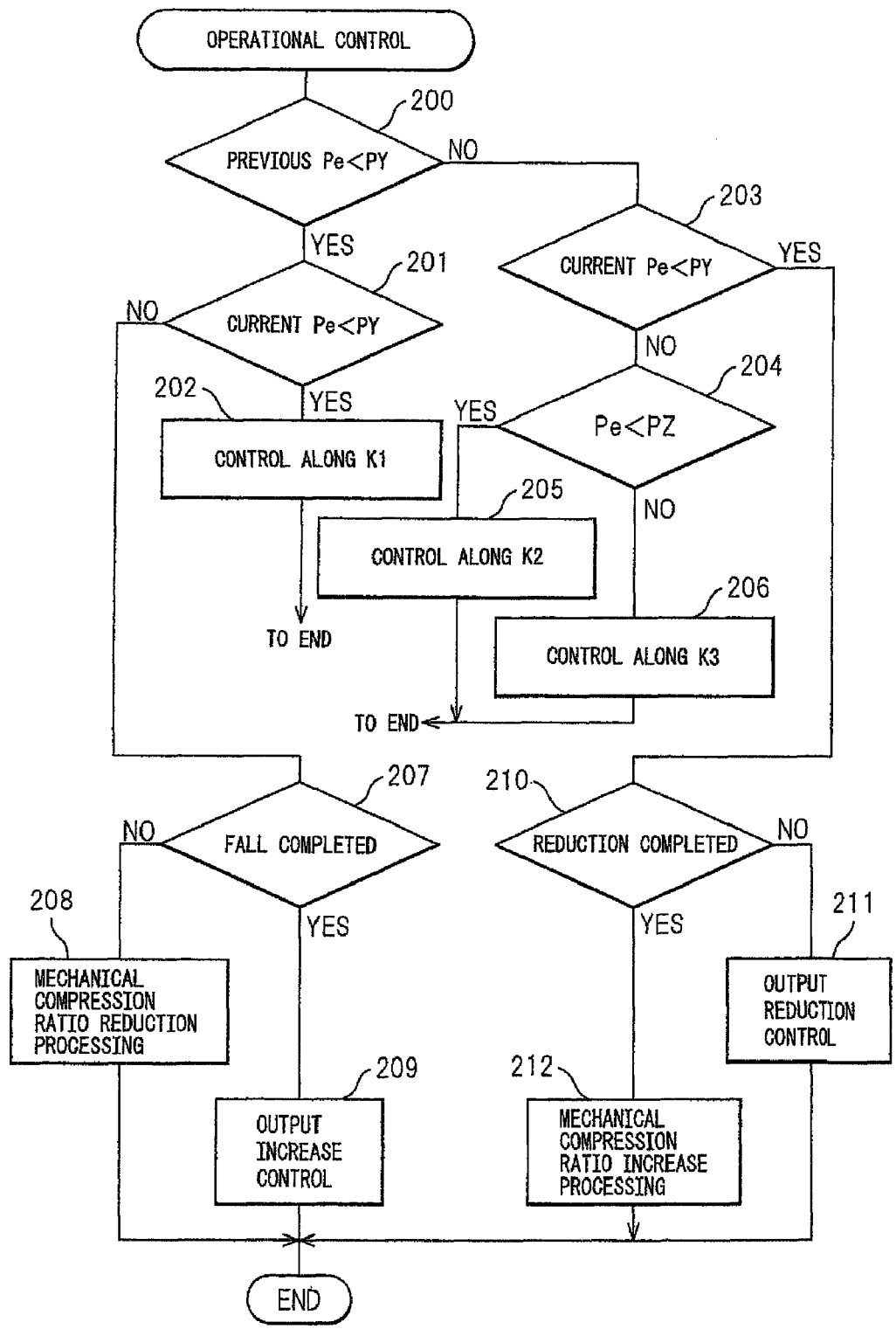
FIG. 24 is a flowchart for operational control.

FIG. 24 shows an operational control routine for executing the first embodiment shown from FIG. 19 to FIG. 23. This routine is executed by interruption at predetermined time intervals.

Referring to FIG. 24, first, at step 200, it is judged if at the time of the previous interruption, the required output of the engine Pe was lower than the first boundary output PY. When at the time of the previous interruption, Pe<PY, the routine proceeds to step 201 where it is judged if at the time of the current interruption, Pe<PY. When at the time of the current interruption, Pe<PY, that is, when the required output of the engine Pe continues to be lower than the first boundary output PY, the routine proceeds to step 202 where the engine torque Te and the engine speed Ne are controlled along the fuel consumption rate maintenance operation line K1.

On the other hand, when it is judged at step 200 that Pe was not less the Py at the time of the previous interruption, the routine proceeds to step 203 where it is judged if Pe<PY at the time of the current interruption. When Pe is not less than PY at the time of the current interruption, that is, when the required output of the engine Pe continues to be higher than the first boundary output PY, the routine proceeds to step 204 where it is judged if the required output of the engine Pe is lower than the second boundary output PZ. When Pe<PZ, the routine proceeds to step 205 where the engine torque Te and the engine speed Ne are controlled along the high torque operation line K2. As opposed to this, when it is judged at step 204 that Pe≧PZ, the routine proceeds to step 206 where the engine torque Te and the engine speed Ne are controlled along the full load operation line K3.

On the other hand, when it is judged at step 201 that Pe is not less the Py at the time of the current interruption, that is, when the required output of the engine exceeds the first boundary output PY, the routine jumps to step 207. At step 207, it is judged if the processing for lowering the mechanical compression ratio has been completed. When the processing for lowering the mechanical compression ratio has not been completed, the routine proceeds to step 208 where the mechanical compression ratio is lowered. Next, when it is judged at step 207 that the processing for lowering the mechanical compression ratio has been completed, the routine proceeds to step 209 where output increase control is performed.

On the other hand, when it is judged at step 203 that Pe<PY at the time of the current interruption, that is, the required output of the engine becomes lower than the first boundary output PY, the routine jumps to step 210. At step 210, it is judged if the control for reducing the engine output has been completed. When the control for reducing the engine output has not been completed, the routine proceeds to step 211 where control for reducing the engine output is performed. Next, when it is judged at step 210 that the control for reducing the engine output has been completed, the routine proceeds to step 212 where processing for increasing the mechanical compression ratio is performed.

Figure 25:
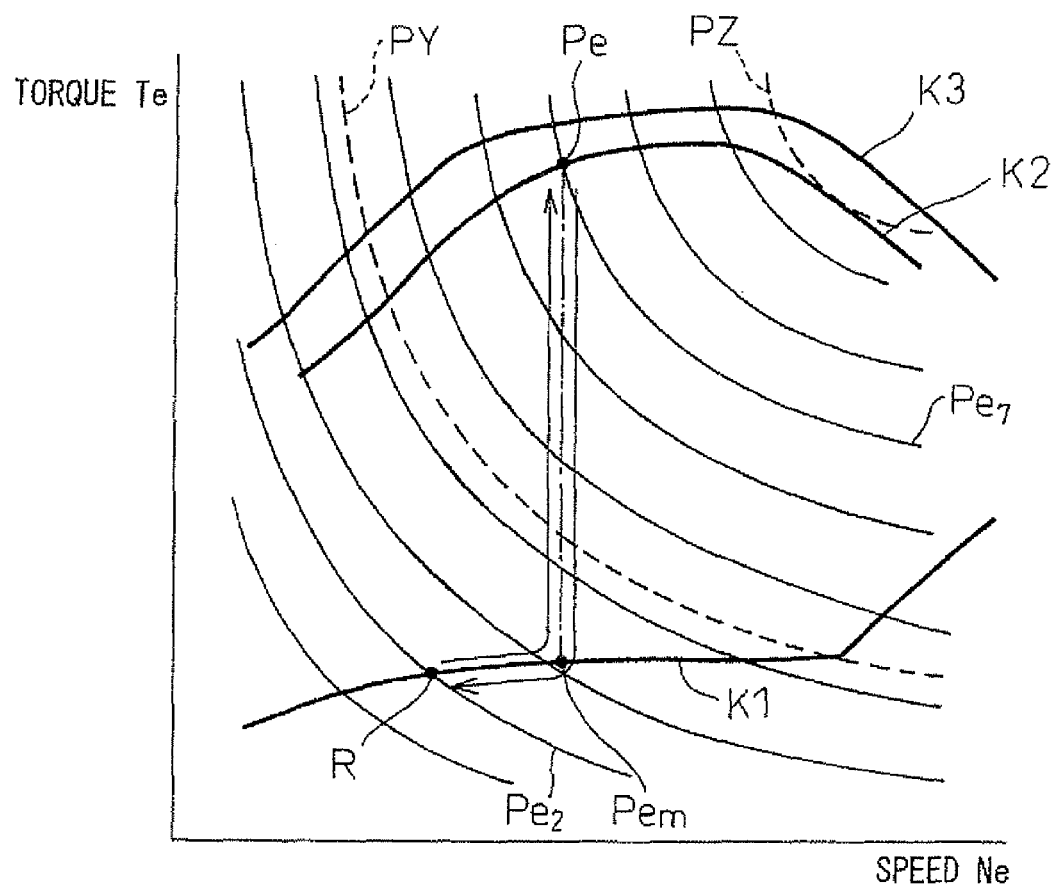
FIG. 25 is view showing the state of changes in the engine torque Te and the engine speed Ne when a required output of the engine is increased or decreased.
Figure 26:
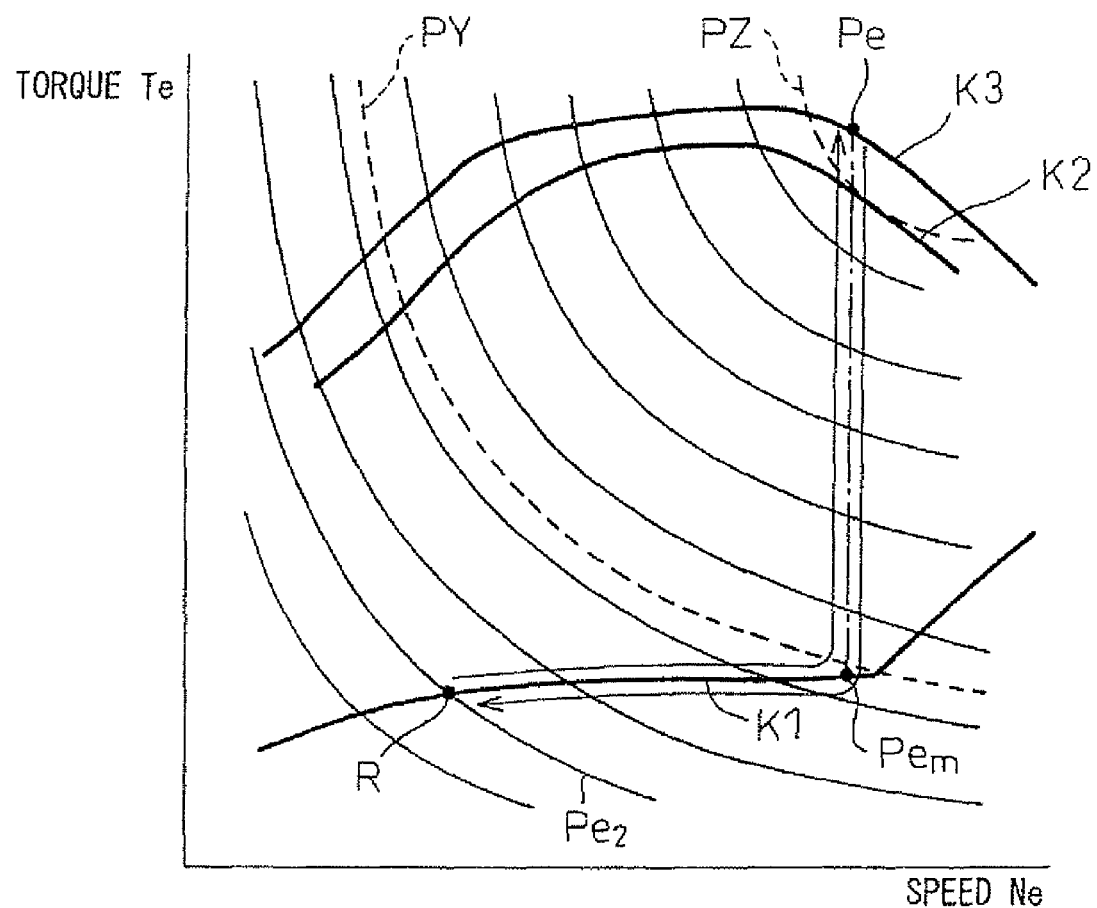
FIG. 26 is view showing the state of changes in the engine torque Te and the engine speed Ne when a required output of the engine is increased or decreased.
Figure 27:
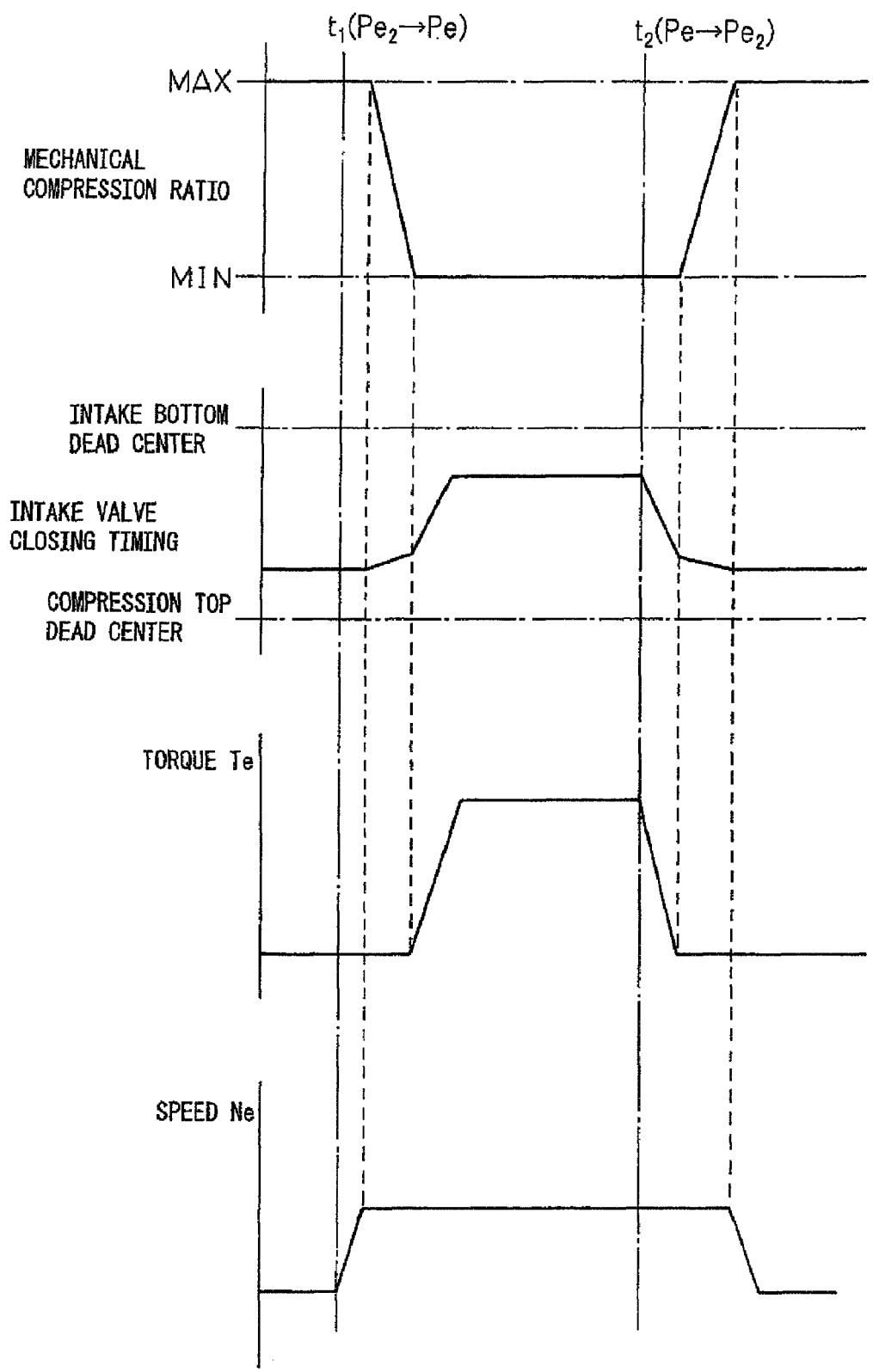
FIG. 27 is a time chart showing the changes in the mechanical compression ratio, closing timing of the intake valve, etc.

FIG. 25 to FIG. 28 show a second embodiment. In this embodiment, as shown in FIG. 25 and FIG. 27, when the output of the engine 1 is $Pe_2$ and in the operating state shown by the point R on the minimum fuel consumption rate operation line K1, if the required output of the engine Pe exceeds the first boundary output PY, first the engine speed Ne is increased along the minimum fuel consumption rate operation line K1 until an engine speed on the high torque operation line K2 satisfying the required output Pe, next, the mechanical compression ratio is reduced from the maximum mechanical compression ratio MAX to the minimum mechanical compression ratio MIN, next, output increase control is performed in the state maintaining the engine speed Ne constant.

That is, in this case, first, the target engine torque and the target engine speed on the high torque operation line K2 satisfying the required output Pe are found, next, the engine speed Ne is made the target engine speed, next, the mechanical compression ratio is lowered to the target mechanical compression ratio, then the engine torque Te is increased from a value on the minimum fuel consumption rate operation line K1 to the target engine torque on the high torque operation line K2.

As opposed to this, when in the operating state where the output of the engine 1 is shown by the point Pe on the high torque operation line K2, if the required output of the engine Pe becomes lower than the first boundary output PY, first the engine speed Ne is maintained constant and in that state output reduction control is performed, next, the mechanical compression ratio is increased from the minimum mechanical compression ratio MIN to the maximum mechanical compression ratio MAX, next, the engine speed Ne is lowered.

On the other hand, as shown in FIG. 26, when the output of the engine 1 is $Pe_2$ and in the operating state shown by the point R on the minimum fuel consumption rate operation line K1, if the required output of the engine Pe exceeds the second boundary output PZ, in the same way as the case of FIG. 25, as shown by FIG. 27, first, the engine speed Ne is increased along the minimum fuel consumption rate operation line K1 until the engine speed on the full load operation line K3 satisfying the required output Pe, next, the mechanical compression ratio is lowered from the maximum mechanical compression ratio MAX to the minimum mechanical compression ratio MIN, next, the engine speed Ne is maintained constant and in that state output increase control is performed.

As opposed to this, when the output of the engine 1 is the operating state shown by the point Pe on the full load operation line K3 and when the required output of the engine Pe becomes lower than the first boundary output PY, first, output reduction control is performed in the state maintaining the engine speed Ne constant. Next, the mechanical compression ratio is increased from the minimum mechanical compression ratio MIN to the maximum mechanical compression ratio MAX, next, the engine speed Ne is reduced.

When the engine torque Te and the engine speed Ne are controlled to the minimum fuel consumption rate operation line K1, if raising the engine speed Ne, the output of the engine increases. On the other hand, as explained above, the engine speed Ne is controlled by the motor generator MG1. The control of the engine speed Ne by this motor generator MG1 is extremely good in response. Therefore, as shown in FIG. 25 or FIG. 26, if increasing the engine speed Ne when there is a request for acceleration, the output of the engine immediately increases and therefore a good feeling of acceleration can be obtained.

Figure 28:
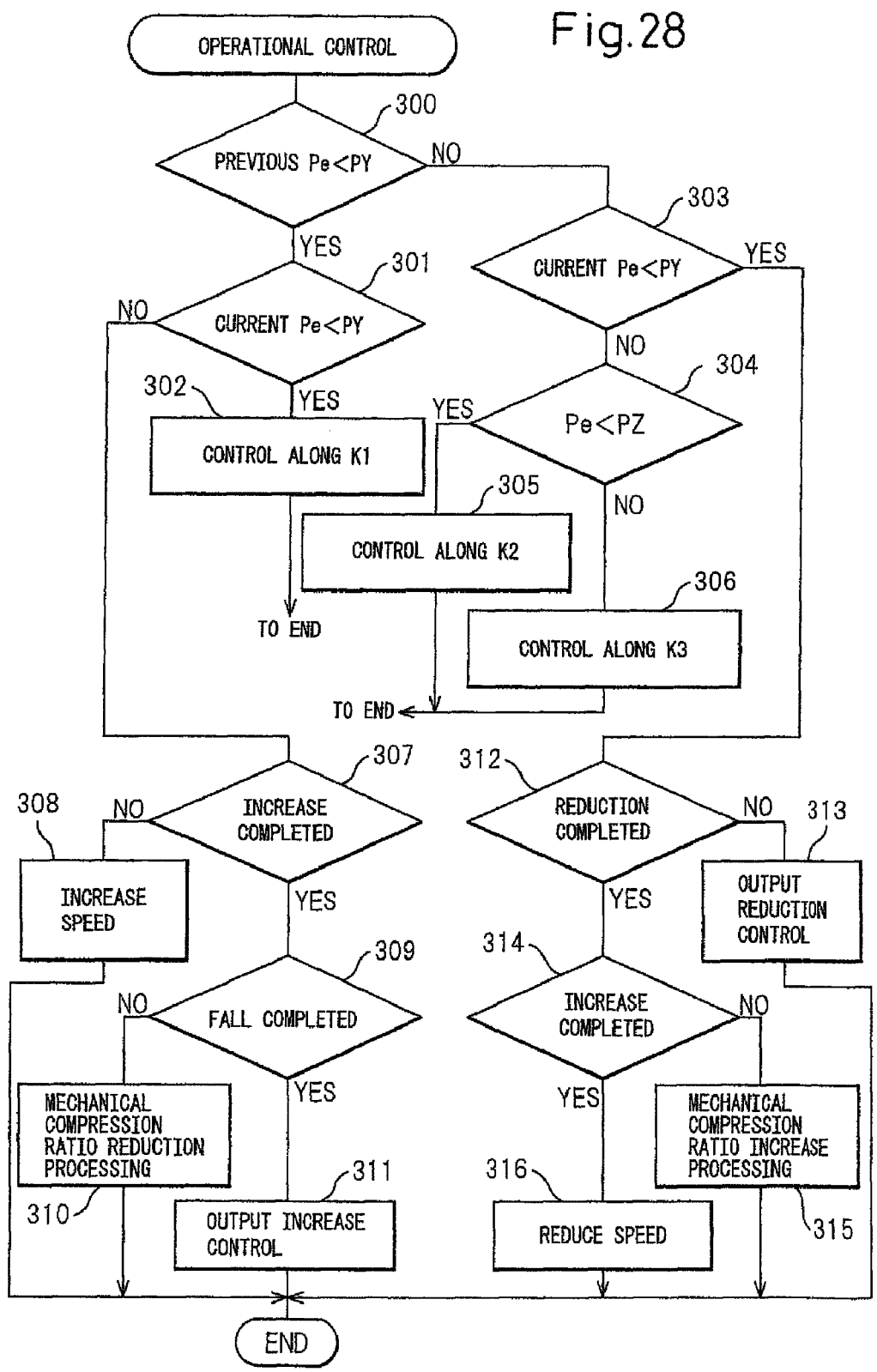
FIG. 28 is a flowchart for operational control.

FIG. 28 shows the operational control routine for executing the second embodiment shown from FIG. 25 to FIG. 27. This routine is also executed by interruption every constant time interval. Note that, in this routine, step 300 to step 306 are the same as step 200 to step 206 of the routine shown in FIG. 24, so the explanation of step 300 to step 306 will be omitted.

Referring to FIG. 28, in this second embodiment, when it is judged at step 301 that Pe is not less than PY at the time of the current interruption, that is, when the required output of the engine exceeds the first boundary output PY, the routine jumps to step 307. At step 307, it is judged whether the processing for increasing the engine speed Ne has been completed. When the processing for increasing the engine speed has not been completed, the routine proceeds to step 308 where the engine speed Ne is increased. Next, when it is judged at step 307 that the processing for increasing the engine speed Ne has been completed, the routine proceeds to step 309.

At step 309, it is judged if the processing for lowering the mechanical compression ratio has been completed. When the processing for lowering the mechanical compression ratio is not completed, the routine proceeds to step 310 where the mechanical compression ratio is lowered. Next, when it is judged at step 309 that the processing for lowering the mechanical compression ratio has been completed, the routine proceeds to step 311 where output increase control is performed.

On the other hand, when it is judged at step 303 that Pe<PY at the time of the current interruption, that is, when the required output of the engine becomes lower than the first boundary output PY, the routine jumps to step 312. At step 312, it is judged if the control for reducing the engine output has been completed. When the control for reducing the engine output has not been completed, the routine proceeds to step 313 where control for reducing the engine output is performed. Next, when it is judged at step 312 that the control for reducing the engine output has been completed, the routine proceeds to step 314.

At step 314, it is judged if the processing for increasing the mechanical compression ratio has been completed. When the processing for increasing the mechanical compression ratio has not been completed, the routine proceeds to step 315 where the mechanical compression ratio is increased. Next, when it is judged at step 314 that the processing for increasing the mechanical compression ratio has been completed, the routine proceeds to step 316 where the engine speed Ne is reduced.

LIST OF REFERENCE NUMERALS

1 . . . spark ignition type engine
2 . . . output regulating system
30 . . . crank case
31 . . . cylinder block
34 . . . combustion chamber
36 . . . intake valve
A . . . variable compression ratio mechanism
B . . . variable valve timing mechanism
MG1, MG2 . . . motor generator

The invention claimed is:

1. An engine control system comprising:
    an output regulating system configured to set a desired combination of an engine torque and an engine speed giving a same engine output;
    a variable compression ratio mechanism configured to change a mechanical compression ratio;
    a variable valve timing mechanism configured to control a closing timing of an intake valve; and
    an electronic control unit configured:
        (1) to perform a minimum fuel consumption rate maintenance control satisfying a required output of the engine by changing the engine speed in a state maintaining the mechanical compression ratio at a predetermined compression ratio or more when a required output of the engine is lower than a predetermined boundary output; and
        (2) to perform an output increase control increasing the engine torque after lowering the mechanical compression ratio to the predetermined compression ratio or less when the required output of the engine increases over the boundary output.

2. An engine control system as claimed in claim 1, wherein the electronic control unit performs the output increase control by controlling the closing timing of the intake valve to increase an amount of intake air into a combustion chamber.

3. An engine control system as claimed in claim 1, wherein said predetermined compression ratio is 20.

4. An engine control system as claimed in claim 1, wherein a relationship between the engine torque and the engine speed when a fuel consumption becomes the minimum is expressed as a minimum fuel consumption rate operation line shaped as a curve extending in a direction of increase of the engine speed when expressed two-dimensionally as a function of the engine torque and engine speed and, when the electronic control unit performs the minimum fuel consumption rate maintenance control, the engine torque and the engine speed are changed along said minimum fuel consumption rate operation line in accordance with a change of the required output of the engine.

5. An engine control system as claimed in claim 4, wherein when expressed two-dimensionally as a function of the engine torque and engine speed, a relationship between the engine torque and the engine speed expressed as a high torque operation line is preset at a high engine torque side from the minimum fuel consumption rate operation line, a target mechanical compression ratio when the engine torque and the engine speed are on the high torque operation line are preset, and, when the electronic control unit performs the output increase control, the engine torque and the engine speed are changed from values on said minimum fuel consumption rate operation line to values on said high torque operation line after the mechanical compression ratio is lowered to said target mechanical compression ratio.

6. An engine control system as claimed in claim 5, wherein the electronic control unit changes the target mechanical compression ratio to the minimum value of the mechanical compression ratio and the electronic control unit makes the high torque operation line a curve where the fuel consumption becomes the minimum when the engine is operated in a state where the mechanical compression ratio is lowered to the minimum value.

7. An engine control system as set forth in claim 5, wherein after the electronic control unit performs the output increase control and the engine torque and the engine speed reach values on the high torque operation line, the electronic control unit changes the engine torque and the engine speed along said high torque operation line so long as the required output of the engine is the boundary output or more.

8. An engine control system as claimed in claim 5, wherein when expressed two-dimensionally as a function of the engine torque and engine speed, a relationship between the engine torque and the engine speed expressed as a full load operation line is preset at a further higher torque side from the high torque operation line and, when a further high torque is required, the electronic control unit changes the engine torque and the engine speed along said full load operation line.

9. An engine control system as claimed in claim 4, wherein when expressed two-dimensionally as a function of the engine torque and engine speed, a relationship between the engine torque and the engine speed expressed as a high torque operation line is preset at a high engine torque side from the minimum fuel consumption rate operation line, the electronic control unit presets a target mechanical compression ratio when the engine torque and the engine speed are on the high torque operation line, and, when the required output of the engine is increased over the boundary output, the electronic control unit first finds the engine torque and the engine speed on said high torque operation line satisfying said required output, next, the electronic control unit makes the engine speed the target engine speed, next, the electronic control unit increases the engine torque from a value on said minimum fuel consumption rate operation line to said target engine torque on said high torque operation line after the electronic control unit lowers the mechanical compression ratio to said target mechanical compression ratio.

\* \* \* \* \*